United States Patent
Montazeri et al.

(10) Patent No.: US 11,805,360 B2
(45) Date of Patent: Oct. 31, 2023

(54) NOISE SUPPRESSION USING TANDEM NETWORKS

(71) Applicant: QUALCOMM Incorporated, San Diego, CA (US)

(72) Inventors: Vahid Montazeri, San Diego, CA (US); Van Nguyen, San Diego, CA (US); Hannes Pessentheiner, Graz (AT); Lae-Hoon Kim, San Diego, CA (US); Erik Visser, San Diego, CA (US); Rogerio Guedes Alves, Macomb Township, MI (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 17/382,166

(22) Filed: Jul. 21, 2021

(65) Prior Publication Data

US 2023/0026735 A1   Jan. 26, 2023

(51) Int. Cl.
*H04R 3/04* (2006.01)
*G06N 3/08* (2023.01)
(Continued)

(52) U.S. Cl.
CPC ............ *H04R 3/04* (2013.01); *G06N 3/08* (2013.01); *H04R 3/005* (2013.01); *H04R 5/033* (2013.01);
(Continued)

(58) Field of Classification Search
CPC .......... H04R 3/04; H04R 3/005; H04R 5/033; H04R 5/04; H04R 2420/07; G06N 3/08;
(Continued)

(56) References Cited

U.S. PATENT DOCUMENTS 8,428,946 B1 * 4/2013 Paniconi ................. G10L 25/84
704/226
10,418,049 B2 * 9/2019 Toriumi ............... G10L 21/0232
(Continued)

FOREIGN PATENT DOCUMENTS

CN    110808058 A    2/2020

OTHER PUBLICATIONS

International Search Report and Written Opinion—PCT/US2022-073104—ISA/EPO—dated Oct. 20, 2022.
(Continued)

*Primary Examiner* — Xu Mei
(74) *Attorney, Agent, or Firm* — QUALCOMM Incorporated; Espartaco Diaz Hidalgo

(57) ABSTRACT

A device includes a memory configured to store instructions and one or more processors configured to execute the instructions. The one or more processors are configured to execute the instructions to receive audio data including a first audio frame corresponding to a first output of a first microphone and a second audio frame corresponding to a second output of a second microphone. The one or more processors are also configured to execute the instructions to provide the audio data to a first noise-suppression network and a second noise-suppression network. The first noise-suppression network is configured to generate a first noise-suppressed audio frame and the second noise-suppression network is configured to generate a second noise-suppressed audio frame. The one or more processors are further configured to execute the instructions to provide the noise-suppressed audio frames to an attention-pooling network. The attention-pooling network is configured to generate an output noise-suppressed audio frame.

26 Claims, 12 Drawing Sheets

(51) Int. Cl.
  *H04R 3/00* (2006.01)
  *H04R 5/033* (2006.01)
  *H04R 5/04* (2006.01)
  *H04S 1/00* (2006.01)
  *H04S 7/00* (2006.01)

(52) U.S. Cl.
  CPC ............... *H04R 5/04* (2013.01); *H04S 1/007* (2013.01); *H04S 7/307* (2013.01); *H04R 2420/07* (2013.01)

(58) Field of Classification Search
  CPC .......... G06N 3/045; G06N 3/09; H04S 1/007; H04S 7/307; G10L 2015/088; G10L 2021/02166; G10L 21/0208; G10L 2021/02165
  USPC ........... 381/94.1–94.9, 98, 91, 92, 122, 123; 704/226–228
  See application file for complete search history.

(56) References Cited

U.S. PATENT DOCUMENTS

| | | | | |
|---|---|---|---|---|
| 11,361,785 | B2* | 6/2022 | Shim ..................... | G10L 25/78 |
| 2003/0147538 | A1* | 8/2003 | Elko ..................... | H04R 3/005 |
| | | | | 381/91 |
| 2008/0069372 | A1* | 3/2008 | Zhang .................... | H04R 3/005 |
| | | | | 381/92 |
| 2013/0073283 | A1* | 3/2013 | Yamabe .............. | G10L 21/0216 |
| | | | | 704/226 |
| 2014/0278385 | A1* | 9/2014 | Fan ..................... | G10K 11/002 |
| | | | | 704/226 |
| 2015/0025878 | A1* | 1/2015 | Gowreesunker ....... | H04R 3/005 |
| | | | | 704/226 |
| 2015/0071461 | A1* | 3/2015 | Thyssen .............. | G10L 21/0208 |
| | | | | 381/94.1 |

OTHER PUBLICATIONS

Correia A. S., et al., "Attention, Please! A Attention Models in Deep Learning", arxiv.org, Cornell University Library, 201 Olin Library Cornell University Ithaca, NY 14853, Mar. 31, 2021, pp.1-66, XP081919769, section: 4 .1, p. 13-p. 17.

Hasannezhad M., et al., "A Novel Low-Complexity Attention-Driven Composite Model for Speech Enhancement", 2019 IEEE International Symposium on Circuits and Systems (ISCAS), IEEE, May 22, 2021, 5 Pages, XP033933363, ISSN: 2158-1525, DOI:10.11091/ISCAS51556.2021.9401385, ISBN: 978-1-7281-3320-1 [retrieved on Apr. 12, 2021] II. Proposed System Description, p. 2, figure 1, III. Experiments, p. 3.

Lengerich C., et al., "An End-to-End Architecture for Keyword Spotting and Voice Activity Detection", arxiv.org, Cornell University Library, 201 Olin Library Cornell University Ithaca, NY 14853, Nov. 28, 2016, pp. 1-5, XP080735236, The whole document.

Xue S., et al., "A Study on Improving Acoustic Model for Robust and Far-Field Speech Recognition", 2018 IEEE 23rd International Conference on Digital Signal Processing (DSP), IEEE, Nov. 19, 2018, 5 Pages, XP033512609, DOI: 10.1109/ICDSP.2018.8531862 [retrieved on Jan. 31, 2019], The whole document.

* cited by examiner

NOISE SUPPRESSION USING TANDEM NETWORKS

I. FIELD

The present disclosure is generally related to noise suppression.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to receive an audio signal from one or more microphones. For example, the audio signal may represent user speech captured by the microphones, external sounds captured by the microphones, or a combination thereof. Different techniques may be used to process audio signals captured by microphones and suppress noise associated with the audio signals. As a non-limiting example, one technique may utilize beamforming techniques to suppress noise. While beamforming techniques work relatively well to suppress noise from noise sources in a fixed position, there may be drawbacks to using beamforming techniques to suppress noise from mobile noise sources. As another non-limiting example, another technique may utilize speech generation techniques, such as a multiple-microphone speech generation network, to suppress noise. While speech generation techniques work relatively well to suppress noise in signals with a high signal-to-noise ratio (SNR), in some implementations, the speech generation techniques may suppress speech in signals with a low SNR.

III. SUMMARY

According to one implementation of the present disclosure, a device includes a memory configured to store instructions and one or more processors configured to execute the instructions. The one or more processors are configured to execute the instructions to receive audio data including a first audio frame corresponding to a first output of a first microphone and a second audio frame corresponding to a second output of a second microphone. The one or more processors are further configured to execute the instructions to provide the audio data to a first noise-suppression network and to a second noise-suppression network. The first noise-suppression network is configured to generate a first noise-suppressed audio frame based on the audio data. The second noise-suppression network is configured to generate a second noise-suppressed audio frame based on the audio data. The one or more processors are also configured to execute the instructions to provide the first noise-suppressed audio frame and the second noise-suppressed audio frame to an attention-pooling network. The attention-pooling network is configured to generate an output noise-suppressed audio frame based at least on the first noise-suppressed audio frame and the second noise-suppressed audio frame.

According to another implementation of the present disclosure, a method includes receiving, at one or more processors, audio data including a first audio frame corresponding to a first output of a first microphone and a second audio frame corresponding to a second output of a second microphone. The method also includes generating, at a first noise-suppression network associated with the one or more processors, a first noise-suppressed audio frame based on the first audio frame and the second audio frame. The method further includes generating, at a second noise-suppression network associated with the one or more processors, a second noise-suppressed audio frame based on the first audio frame and the second audio frame. The method also includes performing, at an attention-pooling network associated with the one or more processors, an attention-pooling operation on at least the first noise-suppressed audio frame and the second noise-suppressed audio frame to generate an output noise-suppressed audio frame.

According to another implementation of the present disclosure, a non-transitory computer-readable medium includes instructions that, when executed by one or more processors, cause the one or more processors to receive audio data including a first audio frame corresponding to a first output of a first microphone and a second audio frame corresponding to a second output of a second microphone. The instructions, when executed by the one or more processors, further cause the one or more processors to generate, at a first noise-suppression network, a first noise-suppressed audio frame based on the first audio frame and the second audio frame. The instructions, when executed by the one or more processors, also cause the one or more processors to generate, at a second noise-suppression network, a second noise-suppressed audio frame based on the first audio frame and the second audio frame. The instructions, when executed by the one or more processors, further cause the one or more processors to perform, at an attention-pooling network, an attention-pooling operation on at least the first noise-suppressed audio frame and the second noise-suppressed audio frame to generate an output noise-suppressed audio frame.

According to another implementation of the present disclosure, an apparatus includes means for receiving audio data including a first audio frame corresponding to a first output of a first microphone and a second audio frame corresponding to a second output of a second microphone. The apparatus also includes means for generating a first noise-suppressed audio frame based on the first audio frame and the second audio frame. The apparatus further includes means for generating a second noise-suppressed audio frame based on the first audio frame and the second audio frame. The apparatus also includes means for performing an attention-pooling operation on at least the first noise-suppressed audio frame and the second noise-suppressed audio frame to generate an output noise-suppressed audio frame.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Systems and methods of generating noise-suppressed audio signals using progressive tandem networking are disclosed. For example, audio signals may be received from a first microphone that is positioned to capture a user's voice and from a second microphone that is positioned to capture external sounds. The audio signals may be provided to different first-level noise-suppression networks. Each first level noise-suppression network may utilize a different algorithm or operation to suppress noise from the audio signals. As non-limiting examples, one of the first-level noise-suppression networks may utilize adaptive beamforming techniques to suppress noise from the audio signals, another of the first-level noise-suppression networks may utilize speech generation techniques to suppress noise from the audio signals. Each first-level noise-suppression network may have advantages over other first-level noise-suppression networks. For example, the first-level noise-suppression network that employs beamforming techniques may work relatively well to suppress noise from noise sources in a fixed position, the first-level noise-suppression network that employs speech generation techniques may work relatively well to suppress noise in signals with a high signal-to-noise ratio (SNR), etc. Outputs of the first-level noise-suppression networks may be provided to a second-level noise-suppression network.

The second-level noise-suppression network may utilize attention-based pooling to leverage the advantages of the first-level noise-suppression networks. For example, the second-level noise-suppression network may assign weights to the outputs of the first-level noise-suppression networks based on a quality of speech associated with each output. Thus, outputs with a relatively high quality of speech may be heavily weighted at the second-level noise-suppression network and outputs with a relatively low quality of speech may be lightly weighted at the second-level noise-suppression network. Such progressive tandem processing may result in an enhanced output speech signal.

Figure 1:
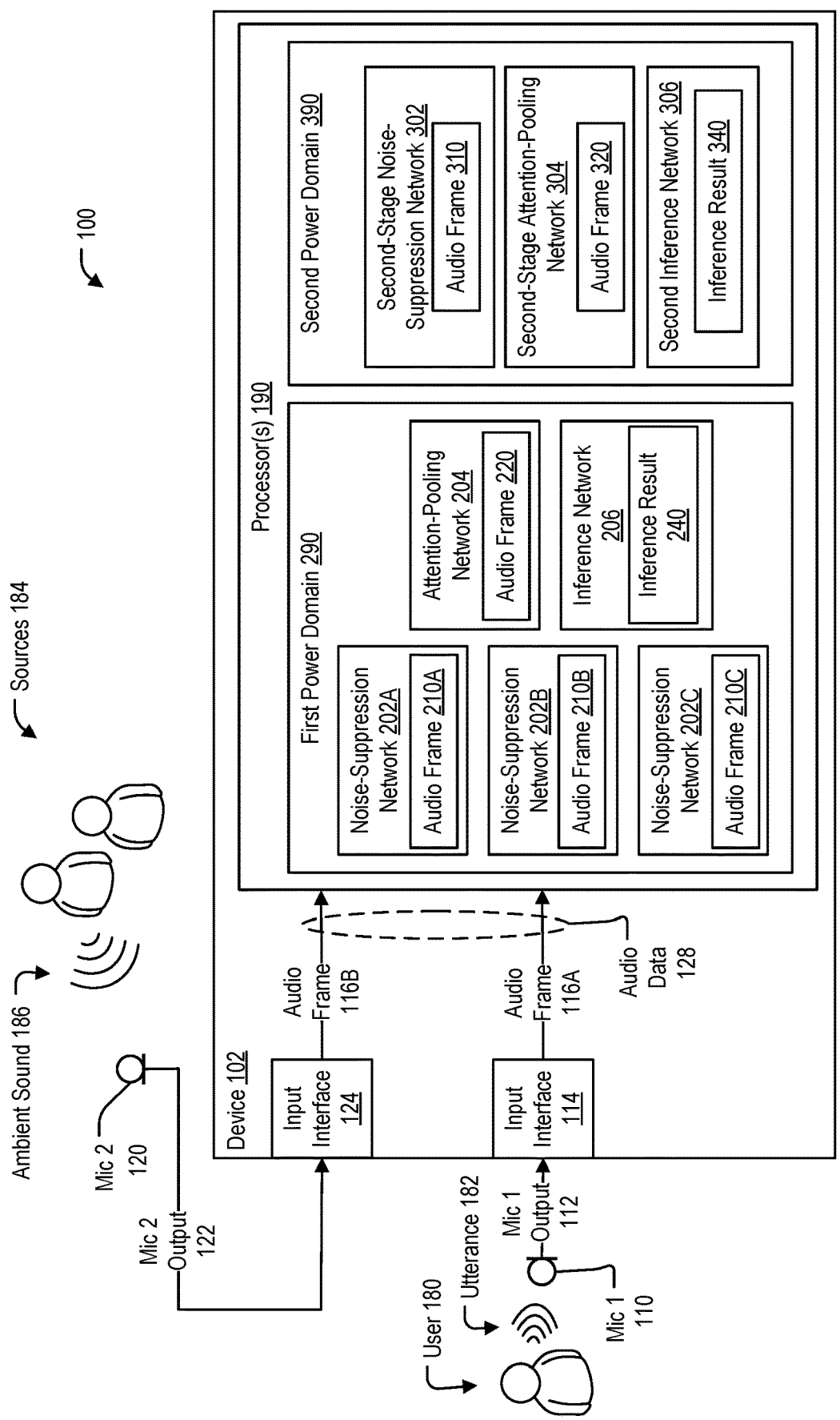
FIG. 1 is a block diagram of a particular illustrative aspect of a system configured to generate a noise-suppressed audio signal using progressive tandem networks, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 190 of FIG. 1), which indicates that in some implementations the device 102 includes a single processor 190 and in other implementations the device 102 includes multiple processors 190. For ease of reference herein, such features are generally introduced as "one or more" features and are subsequently referred to in the singular unless aspects related to multiple of the features are being described.

It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system configured to generate a noise-suppressed audio signal using progressive tandem networks is disclosed and generally designated 100. The system 100 includes a device 102 that is coupled to a first microphone 110 and a second microphone 120.

The device 102 is configured to generate a noise-suppressed audio signal (e.g., an enhanced speech signal) for sounds captured by the microphones 110, 120 using noise-suppression networks operating in tandem. In an implementation in which the device 102 corresponds to a headset, the first microphone 110 (e.g., a "primary" microphone) may be configured to primarily capture utterances 182 of a user 180 of the device 102, such as microphone positioned proximate to the mouth of a wearer of the device 102, and the second microphone 120 (e.g., a "secondary" microphone) may be configured to primarily capture ambient sound, such as positioned proximate to an ear of the wearer. In other implementations, such as when the device 102 corresponds to a standalone voice assistant (e.g., including a loudspeaker with microphones, as described further with reference to FIG. 11) that may be in the vicinity of multiple people, the device 102 may be configured to detect speech from the person closest to the primary microphone as self-voice activity, even though the person may be relatively remote from the primary microphone as compared to in a headset implementation.

The device 102 includes a first input interface 114, a second input interface 124, and one or more processors 190. The first input interface 114 is coupled to the one or more processors 190 and is configured to be coupled to the first microphone 110. The first input interface 114 is configured to receive a first microphone output 112 from the first microphone 110 and to provide the first microphone output 112 to the processor 190 as an audio frame 116A. The second input interface 124 is coupled to the one or more processors 190 and is configured to be coupled to the second microphone 120. The second input interface 124 is configured to receive a second microphone output 122 from the second microphone 120 and to provide the second microphone output 122 to the processor 190 as an audio frame 116B. The audio frames 116A, 116B may also be referred to herein as audio data 128.

The one or more processors 190 include a first power domain 290 and a second power domain 390. The first power domain 290 may be configured to operate at a first power level, and the second power domain 390 may be configured to operate at a second power level that is greater than the first power level. Although two power domains 290, 390 are illustrated, in other implementations, the one or more processors 190 can include a single power domain. For example, in some implementations, the one or more processors 190 can include the components of the first power domain 290. In yet other implementations, the one or more processors 190 can include three or more power domains. As a non-limiting example, a headset can include two power domains and a mobile phone, paired with the headset, can include an additional power domain.

In the example illustrated in FIG. 1, the components of the first power domain 290 include a noise-suppression network 202A, a noise-suppression network 202B, a noise-suppression network 202C, an attention-pooling network 204, and an inference network 206. As described below, the noise-suppression networks 202 may operate in tandem with the attention-pooling network 204. Although three noise-suppression networks 202 are depicted, in other implementations, the first power domain 290 can include additional noise-suppression networks 202. As a non-limiting example, according to one implementation, the first power domain 290 can include five noise-suppression networks 202 operating in tandem with the attention-pooling network 204. In other implementations, the first power domain 290 can include fewer noise-suppression networks 202. As a non-limiting example, according to one implementation, the first power domain 290 can include two noise-suppression networks operating in tandem with the attention-pooling network 204.

According to one implementation, the noise-suppression network 202A can correspond to a speech generation network, the noise-suppression network 202B can correspond to a generalized eigenvalue network, and the noise-suppression network 202C can correspond to an adaptive beamforming network. It should be understood that one or more of the noise-suppression networks 202 can correspond to another network or can employ different algorithms to generate noise-suppressed audio frames and that the above examples are merely illustrative.

The noise-suppression network 202A may be configured to generate a noise-suppressed audio frame 210A based on the audio frames 116A, 116B. As described above, the noise-suppression network 202A may correspond to a speech generation network, such as a multi-microphone speech generation network (MSGN). The noise-suppression network 202A may employ a speech generation network algorithm to perform a noise-suppression operation on the audio frames 116A, 116B and generate the noise-suppressed audio frame 210A. The noise-suppression operation may include filtering or suppressing noise components of the audio frames 116A, 116B and using the speech components of the audio frames 116A, 116B to generate the noise-suppressed audio frame 210A. Thus, the noise-suppressed audio frame 210A may correspond to a speech frame (e.g., an enhanced speech frame or a noise-reduced speech signal) that includes the speech components of the audio frames 116A, 116B. The noise-suppressed audio frame 210A is provided to the attention-pooling network 204.

The noise-suppression network 202B may be configured to generate a noise-suppressed audio frame 210B based on the audio frames 116A, 116B. As described above, the noise-suppression network 202B may correspond to a generalized eigenvalue network. The noise-suppression network 202B may employ a generalized eigenvalue algorithm to perform a noise-suppression operation on the audio frames 116A, 116B and generate the noise-suppressed audio frame 210B. The noise-suppressed audio frame 210B may correspond to a speech frame (e.g., an enhanced speech frame or a noise-reduced speech signal) that includes the speech components of the audio frames 116A, 116B. The noise-suppressed audio frame 210B is provided to the attention-pooling network 204.

The noise-suppression network 202C may be configured to generate a noise-suppressed audio frame 210C based on the audio frames 116A, 116B. As described above, the noise-suppression network 202C may correspond to an adaptive beamforming network. The noise-suppression network 202C may employ an adaptive beamforming algorithm to perform a noise-suppression operation on the audio frames 116A, 116B and generate the noise-suppressed audio frame 210C. The noise-suppressed audio frame 210C may correspond to a speech frame (e.g., an enhanced speech frame or a noise-reduced speech signal) that includes the speech components of the audio frames 116A, 116B. The noise-suppressed audio frame 210C is provided to the attention-pooling network 204.

The attention-pooling network 204 may be configured to generate an output noise-suppressed audio frame 220 based on the audio frame 116A, the audio frame 116B, the noise-suppressed audio frame 210A, the noise-suppressed audio frame 210B, the noise-suppressed audio frame 210C, or a combination thereof. The attention-pooling network 204 may employ attention-based pooling to assign different weights to each input (e.g., each incoming audio frame) in generating the output noise-suppressed audio frame 220. To illustrate, the attention-pooling network 204 may weight each incoming frame 116, 210 based on a quality of speech. For example, if the noise-suppressed audio frame 210A has a relatively high quality of speech and the noise-suppressed audio frame 210B has a relatively low quality of speech (e.g., is a substantially noisy frame), the attention-pooling network 204 may assign a larger weight to the noise-suppressed audio frame 210A in generating the output noise-suppressed audio frame 220. By assigning larger weights to incoming frames having relatively high qualities of speech, the output noise-suppressed audio frame 220 generated by the attention-pooling network 204 may correspond to an enhanced speech frame (e.g., an enhanced speech signal). The operations of the attention-pooling network 204 are described in greater detail with respect to FIG. 4. The output noised-suppressed audio frame 220 is provided to the inference network 206.

The inference network 206 may be configured to perform a classification task on the output noise-suppressed audio frame 220 to generate an inference result 240. According to one implementation, the classification task may correspond to a keyword spotting task. For example, the inference network 206 can determine whether a particular keyword (or a portion of the particular keyword) is included or uttered in the utterance 182 of the user 180. If the keyword is uttered, a task associated with the keyword can be performed. As non-limiting example, the task could include playing music, turning on a light, etc. The inference result 240 can be a binary value (e.g., a flag) that indicates whether the particular keyword is uttered or can be a confidence value that indicates a likelihood (or confidence) as to whether the keyword is uttered. It should be understood that, in other implementations, the classification task can correspond to other tasks, such as an automatic speech recognition task, a task associated with a voice call, an utterance verification task, etc.

Figure 3:
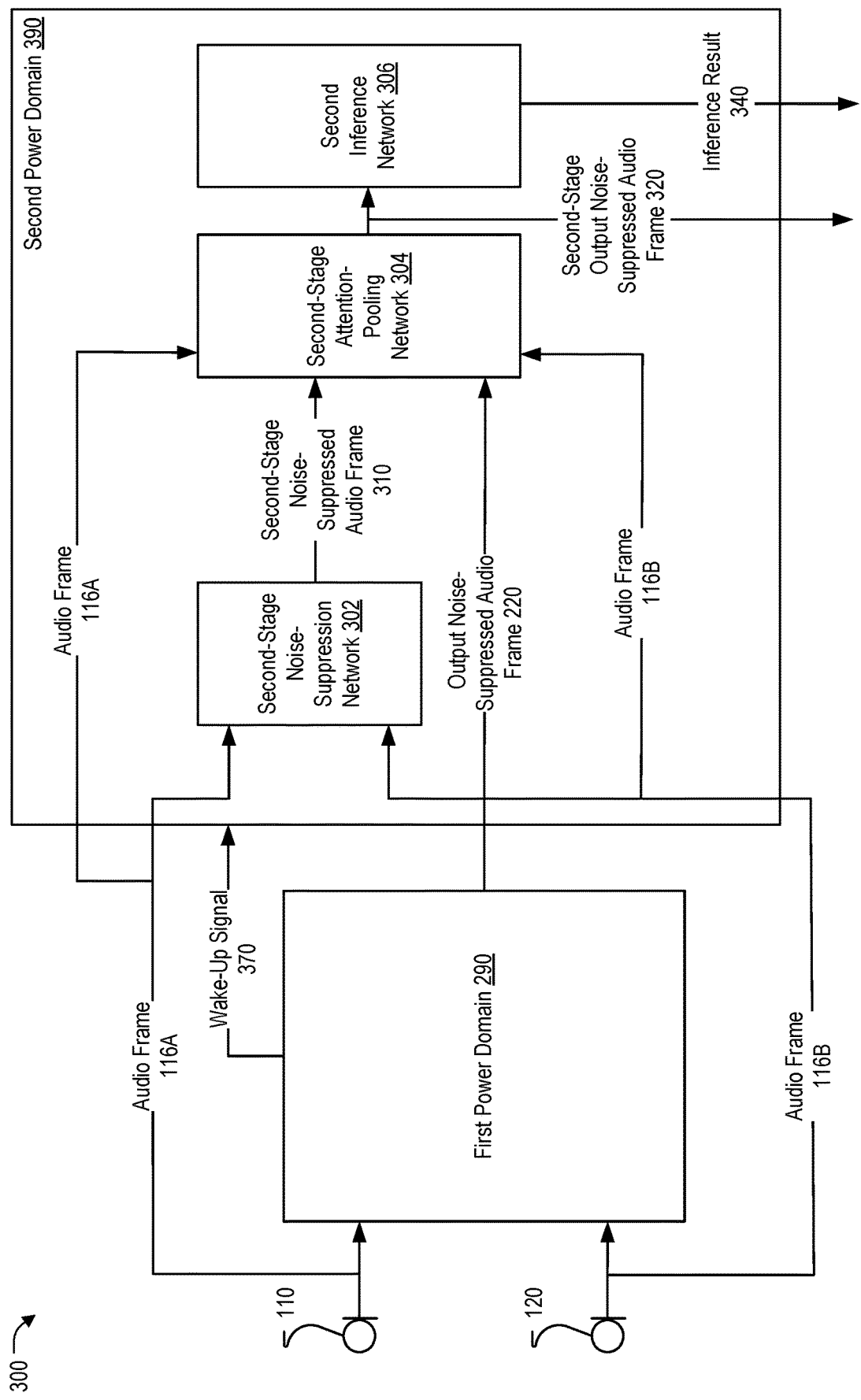
FIG. 3 is a diagram of an illustrative aspect of a system configured to verify a classification result using progressive tandem networks, in accordance with some examples of the present disclosure.

In the example illustrated in FIG. 1, the second power domain 390 includes a second-stage noise-suppression network 302, a second-stage attention-pooling network 304, and a second inference network 306. Although one second-stage noise-suppression network 302 is depicted, in other implementations, the second power domain 390 can include additional second-stage noise-suppression networks 302. As a non-limiting example, according to one implementation, the second power domain 390 can include three second-stage noise-suppression networks 302. The components of the second power domain 390 may operate to verify the inference result 240. For example, when the inference result 240 of the first power domain 290 indicates a positive result, such as detection of a keyword in the utterance 182, the first power domain 290 can generate and send a wake-up signal, as illustrated in FIG. 3, to the second power domain 390. Upon receiving the wake-up signal, the components of the second power domain 390 may work in tandem with the components of the first power domain 290 to verify the inference result 240.

The audio frames 116 are provided to the second-stage noise-suppression network 302 and to the second-stage attention-pooling network 304. The second-stage noise-suppression network 302 may be configured to generate a second-stage noise-suppressed audio frame 310 based on the audio frames 116A, 116B. As a non-limiting example, the second-stage noise-suppression network 302 performs a noise-suppression operation on the audio frames 116A, 116B to generate the second-stage noise-suppressed audio frame 310. The noise-suppression operation may be a high-power operation that includes filtering or suppressing noise components of the audio frames 116A, 116B and using the speech components of the audio frames 116A, 116B to generate the second-stage noise-suppressed audio frame 310. Thus, the second-stage noise-suppressed audio frame 310 may correspond to a speech frame (e.g., an enhanced speech frame or a noise-reduced speech signal) that includes the speech components of the audio frames 116A, 116B. The second-stage noise-suppressed audio frame 310 is provided to the second-stage attention-pooling network 304.

The output-noise suppressed audio frame 220 from the first power domain 290 may also be provided to the second-stage attention-pooling network 304. The second-stage attention-pooling network 304 may be configured to generate a second-stage output noise-suppressed audio frame 320 based on the audio frame 116A, the audio frame 116B, the output noise-suppressed audio frame 220, the second-stage output noise-suppressed audio frame 310, or a combination thereof. The second-stage attention-pooling network 304 may employ attention-based pooling to assign different weights to each input in generating the second-stage output noise-suppressed audio frame 320. To illustrate, the second-stage attention-pooling network 304 may weight each incoming frame 116, 220, 310 based on a quality of speech. For example, if the second-stage noise-suppressed audio frame 310 has a relatively high quality of speech (e.g., a high signal-to-noise ratio), the second-stage attention-pooling network 304 may assign a larger weight to the second-stage noise-suppressed audio frame 310 in generating the second-stage output noise-suppressed audio frame 320. By assigning larger weights to incoming frames having relatively high qualities of speech, the second-stage output noise-suppressed audio frame 320 generated by the second-stage attention-pooling network 304 may correspond to an enhanced speech frame (e.g., an enhanced speech signal). The second-stage output noised-suppressed audio frame 320 is provided to the second-stage inference network 306.

The second-stage inference network 306 may be configured to perform the classification task (e.g., the same classification performed by the inference network 206) on the second-stage output noise-suppressed audio frame 320 to verify the inference result 240. For example, the second-stage inference network 306 can perform the classification task on the second-stage output noise-suppressed audio frame 320 to generate an inference result 340. If the inference result 340 matches (or substantially matches) the inference result 240, the inference result 240 may be verified. According to one implementation, the inference result 340 may substantially match the inference result 240 if the confidence value is within a five percent threshold. However, in other implementations, different thresholds can be used to verify the inference result 240.

The techniques described with respect to FIG. 1 enable advantages of each noise-suppression network 202A, 202B, 202C to be leveraged in generating an enhanced speech signal (e.g., the output noise-suppressed audio frame 220) that can be used to perform a classification task. For example, by performing attention-based pooling on the outputs of the individual noise-suppression networks 202, the attention-pooling network 204 can assign heavier weights to outputs of the noise-suppression networks 202 utilizing algorithms (or noise-suppression techniques) that complement the classification task and can assign lighter weights to outputs of the noise-suppression networks 202 utilizing algorithms that would not particularly benefit the classification task. The techniques described with respect to FIG. 1 also enable selective activation of the high-efficiency, high-power domain 390 to verify the inference result 240. Because the second power domain 390 utilizes a larger amount of memory than the first power domain 290 and consumes a greater amount of power than the first power domain 290, selectively activating the second power domain 390 to verify the inference result 240 can relax memory constraints and reduce power consumption (e.g., increase power efficiency).

Figure 2:
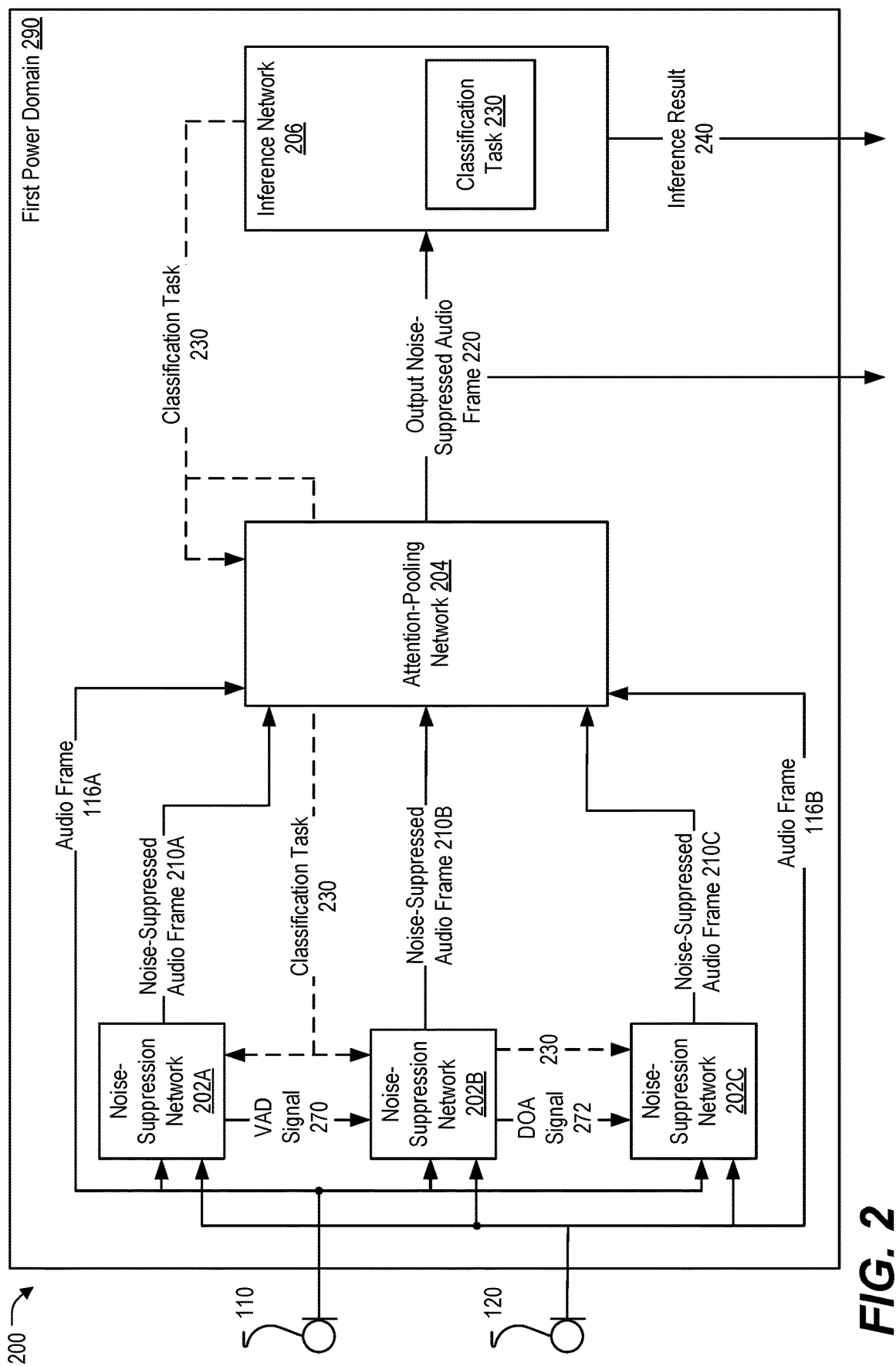
FIG. 2 is a diagram of an illustrative aspect of a system configured to generate a noise-suppressed audio signal using tandem networks, in accordance with some examples of the present disclosure.

Referring to FIG. 2, another particular illustrative aspect of a system configured to generate a noise-suppressed audio signal using progressive tandem networks is disclosed and generally designated 200. The system 200 includes the microphone 110, the microphone 120, and components of a first power domain 290.

The first power domain 290 may be a low-power domain integrated into the one or more processors 190 of FIG. 1. The components of the first power domain 290 include the noise-suppression network 202A, the noise-suppression network 202B, the noise-suppression network 202C, the attention-pooling network 204, and the inference network 206. The noise-suppression networks 202 may operate in tandem with the attention-pooling network 204 to generate the output noise-suppressed audio frame 220 while consuming a relatively low amount of power. For example, each noise-suppression network 202 can employ different algorithms to generate enhanced speech signals (e.g., noise-suppressed audio frames 210). The attention-pooling network 204 can perform attention-based pooling on the enhanced speech signals from the noise-suppression networks 202 to leverage the advantages of each noise-suppression network 202 and generate the resulting output noise-suppressed audio frame 220.

To illustrate, the audio frames 116 are provided to the noise-suppression networks 202 and to the attention-pooling network 204. The noise-suppression network 202A may be configured to generate the noise-suppressed audio frame 210A based on the audio frames 116A, 116B. As described above, the noise-suppression network 202A may correspond to a speech generation network and may employ a speech generation network algorithm to perform a noise-suppression operation on the audio frames 116A, 116B to generate the noise-suppressed audio frame 210A. The noise-suppressed audio frame 210A may correspond to a speech frame (e.g., an enhanced speech frame or a noise-reduced speech signal) that includes the speech components of the audio frames 116A, 116B. The noise-suppressed audio frame 210A is provided to the attention-pooling network 204.

According to some implementations, the noise-suppression network 202A can generate a voice activity detection (VAD) signal 270 based on the audio frames 116A, 116B. The VAD signal 270 may indicate speech-dominant frequency ranges in the audio frames 116A, 116B, noise-dominant frequency ranges in the audio frames 116A, 116B, or both. For example, the VAD signal 270 may indicate a first set of frequency ranges associated with the audio data 128 that are speech-dominant and may indicate a second set of frequency ranges associated with the audio data 128 that are noise-dominant. The VAD signal 270 can be provided to at least one of the other noise-suppression networks 202B, 202C.

The noise-suppression network 202B may be configured to generate the noise-suppressed audio frame 210B based on the audio frames 116A, 116B. As described above, the noise-suppression network 202B may correspond to a generalized eigenvalue network and may employ a generalized eigenvalue algorithm to perform a noise-suppression operation on the audio frames 116A, 116B to generate the noise-suppressed audio frame 210B. In some implementations, the noise-suppression network 202B can identify the speech-dominate frequency ranges in the audio frames 116A, 116B based on the VAD signal 270. Based on the identified speech-dominate frequency ranges, the noise-suppression network 202B can filter noise components, suppress noise components, or perform other noise-suppression operations on the audio frames 116A, 116B to generate the noise-suppressed audio frame 210B. The noise-suppressed audio frame 210B may correspond to a speech frame (e.g., an enhanced speech frame or a noise-reduced speech signal) that includes the speech components of the audio frames 116A, 116B. The noise-suppressed audio frame 210B is provided to the attention-pooling network 204.

According to some implementations, the noise-suppression network 202B is configured to perform direction-of-arrival (DOA) processing on the audio frames 116 to determine a DOA of incoming speech, a DOA of incoming noise, or both. Based on the DOA processing, the noise-suppression network 202B may generate a DOA signal 272 that indicates a direction from which speech-dominant frames arrive (e.g., are captured) by the microphones 110, 120. As described below, the DOA signal 272 can be used by an adaptive beamforming network to generate a noise-suppressed audio frame 210C. For example, the parameters of the adaptive beamforming network may be adjusted based on an output of the DOA processing. To illustrate, the parameters of the adaptive beamforming network may be adjusted to steer a beamforming array towards the DOA of the incoming speech. Although the noise-suppression network 202B is illustrated as generating the DOA signal 272 in FIG. 2, in other implementations, the noise-suppression network 202A can generate the DOA signal 272.

The noise-suppression network 202C may be configured to generate the noise-suppressed audio frame 210C based on the audio frames 116A, 116B. As described above, the noise-suppression network 202C may correspond to an adaptive beamforming network and may employ an adaptive beamforming algorithm to perform a noise-suppression operation on the audio frames 116A, 116B to generate the noise-suppressed audio frame 210C. In some implementations, the noise-suppression network 202C can determine the DOA of speech-dominant frames based on the DOA signal 272 and can adjust beamforming parameters of the adaptive beamforming algorithm to improve beamforming noise-suppression operations. The noise-suppressed audio frame 210C may correspond to a speech frame (e.g., an enhanced speech frame or a noise-reduced speech signal) that includes the speech components of the audio frames 116A, 116B. The noise-suppressed audio frame 210C is provided to the attention-pooling network 204. Additionally, or in the alternative, according to some implementations, the noise-suppression network 202C may generate the noise-suppressed audio frame 210C by employing an adaptive null-forming algorithm. For example, the noise-suppression network 202C can determine the DOA of noise-dominant frames in order to identify a null-forming direction. Based on the DOA of the noise-dominant frames, the noise-suppression network 202C can suppress the corresponding noise (e.g., by forming a null corresponding to the DOA of the noise-dominant frames) to generate the noise-suppressed audio frame 210C.

The attention-pooling network 204 may be configured to generate the output noise-suppressed audio frame 220 based on the audio frame 116A, the audio frame 116B, the noise-suppressed audio frame 210A, the noise-suppressed audio frame 210B, the noise-suppressed audio frame 210C, or a combination thereof. The attention-pooling network 204 may employ attention-based pooling to assign different weights to each input in generating the output noise-suppressed audio frame 220. To illustrate, the attention-pooling network 204 may weight each incoming frame 116, 210 based on a quality of speech. For example, if the noise-suppressed audio frame 210A has a relatively high quality of speech and the noise-suppressed audio frame 210B has a relatively low quality of speech (e.g., is a substantially noisy frame), the attention-pooling network 204 may assign a larger weight to the noise-suppressed audio frame 210A in generating the output noise-suppressed audio frame 220. By assigning larger weights to incoming frames having relatively high qualities of speech, the output noise-suppressed audio frame 220 generated by the attention-pooling network 204 may correspond to an enhanced speech frame (e.g., an enhanced speech signal). The operations of the attention-pooling network 204 are described in greater detail with respect to FIG. 4. The output noise-suppressed audio frame 220 is provided to the inference network 206.

The output noise-suppressed audio frame 220 may be used in different context. As a non-limiting example, during a voice call, the output noise-suppressed audio frame 220 may be generated and sent to a receiver device to improve a call quality by suppressing noise at the microphones 110, 120. As another non-limiting example, if a user is giving a verbal command, the output noise-suppressed audio frame 220 may be used to clearly articulate the verbal command in an environment in which speech captured by the microphones 110, 120 is subject to a relatively large amount of noise. It should be understood that the output noise-suppressed audio frame 220 may be used in other context, including, but not limited to, the examples described with respect to FIGS. 5-14.

The inference network 206 may be configured to perform a classification task 230 on the output noise-suppressed audio frame 220 to generate the inference result 240. According to some implementations, the classification task 230 may correspond to a keyword spotting task and the inference network 206 can determine whether a particular keyword (or a portion of the particular keyword) is included or uttered in the output noise-suppressed audio frame 220. The inference result 240 can be a binary value (e.g., a flag) that indicates whether the particular keyword is uttered or can be a confidence value that indicates a likelihood (or confidence) that the keyword is uttered. It should be understood that, in other implementations, the classification task 230 can correspond to other tasks, such as an automatic speech recognition task, a task associated with a voice call, an utterance verification task, etc.

According to some implementations, the classification task 230, or an output of the inference network 206, can be used to train the noise-suppression networks 202 and the attention-pooling network 204. As a non-limiting example, as illustrated in FIG. 2, an indication of the classification task 230 can be provided to the noise-suppression networks 202 and to the attention-pooling network 204. Each noise-suppression network 202 may adjust or tune its respective algorithm based on the classification task. Additionally, the attention-pooling network 204 may adjust weights applied to each input based on the classification task 230.

As a non-limiting example, the noise-suppression network 202C may adjust the adaptive beamforming algorithm to reflect sounds arriving from a relatively large number of angles if the classification task 230 corresponds to an automatic speech recognition task. By adjusting the adaptive beamforming algorithm to reflect sounds arriving from a relatively large number of angles, the noise-suppression network 202C may have a greater likelihood of generating a noise-suppressed audio frame 210C that includes speech. In a similar manner, if the classification task 230 corresponds to an automatic speech recognition task, the attention-pooling network 204 may assign a relatively large weight value to an output of an adaptive beamforming network, such as the noise-suppressed audio frame 210C, and may assign relatively small weight values to the other noise-suppressed audio frames 210A, 210B that are generated from networks tailored to detecting speech from a single location. Assigning a large weight to an output of an adaptive beamforming network may result in the output noise-suppressed audio frame 220 reflecting sounds from multiple angles of arrival, which in turn, may aid the inference network 206 in recognizing speech.

However, if the classification task 230 corresponds to a keyword spotting task, the noise-suppression network 202C may adjust the adaptive beamforming algorithm to capture sounds arriving from an angle associated with speech. As used herein, a keyword "spotting" task and a keyword "detection" task can be used interchangeably. Additionally, if the classification task 230 corresponds to a keyword spotting task, the attention-pooling network 204 may assign a relatively large weight value to an output of a speech generation network, such as the noise-suppressed audio frame 210A.

Training of the noise-suppression networks 202 and the attention-pooling network 204 may also be based on a speech enhancement loss associated with the output noise-suppressed audio frame 220 and a classification loss associated with the inference result 240. For example, the one or more processors 190 may determine the speech enhancement loss associated with the output noise-suppressed audio frame 220. The speech enhancement loss may correspond to loss or distortion of speech due to progressive tandem processing at the noise-suppression networks 202 and the attention-pooling network 204. The speech enhancement loss can be determined based on a confidence value of a previously generated output noise-supped audio frame and a confidence value of the current output noise-suppressed audio frame 220. Additionally, the one or more processors 190 may determine the classification loss associated with the inference result 240. The classification loss may correspond to a degree of error in performing the classification task 230. In a similar manner, the classification loss can be determined based on a confidence value of a previously generated inference result and a confidence value of the current inference result 240. The one or more processors 190 may determine a joint loss based on the speech enhancement loss and the classification loss. The joint loss may be used to further train (i.e., "joint training") the noise-suppression networks 202 and the attention-pooling network 204 during runtime to dynamically improve operation of the system 200.

The techniques described with respect to FIG. 2 enable advantages of each noise-suppression network 202A, 202B, 202C to be leveraged to generate an enhanced speech signal (e.g., the output noise-suppressed audio frame 220) that can be used to perform the classification task 230. For example, by performing attention-based pooling on the outputs of the individual noise-suppression networks 202, the attention-pooling network 204 can assign heavier weights to outputs of the noise-suppression networks 202 utilizing algorithms (or noise-suppression techniques) that complement the classification task 230 and can assign lighter weights to outputs of the noise-suppression networks 202 utilizing algorithms that would not particularly benefit the classification task 230. Additionally, the system 200 can utilize joint training to improve the algorithms used by the noise-suppression networks 202 based on the classification task 230. For example, in addition to training the noise-suppression networks 202 using training data, the inference network 206 can be used to provide real-time dynamic training of the noise-suppression networks 202. It should be appreciated that the inference network 206 can also be utilized to provide real-time dynamic training to the attention-pooling network 204.

Referring to FIG. 3, another particular illustrative aspect of a system configured to verify a classification result using high-power progressive tandem networks is disclosed and generally designated 300. The system 300 includes the microphone 110, the microphone 120, the first power domain 290, and components of a second power domain 390.

The second power domain 390 may be a high-power domain integrated into the one or more processors 190 of FIG. 1. For example, the second power domain 390 may operate at a second power level that is greater than a first power level associated with the first power domain 290. The components of the second power domain 390 may operate in tandem to verify the inference result 240. For example, when the inference result 240 indicates a positive result, such as detection of a keyword, the first power domain 290 can generate and send the wake-up signal 370 to the second power domain 390. Upon receiving the wake-up signal 370, the components of the second power domain 390 may work in tandem to generate an inference result 340. For example, based on the wake-up signal 370, the second power domain 390 may transition from a low-power mode to an active mode to generate the inference result 340. The one or more processors 190 may verify the inference result 240 by comparing the inference result 340 with the inference result 240.

The components of the second power domain 390 include the second-stage noise-suppression network 302, the second-stage attention-pooling network 304, and the second inference network 306. Although one second-stage noise-suppression network 302 is depicted, in other implementations, the second power domain 390 can include additional second-stage noise-suppression networks 302. As a non-limiting example, according to one implementation, the second power domain 390 can include three second-stage noise-suppression networks 302. The second-stage noise-suppression network 302 can correspond to a speech generation network, a generalized eigenvalue network, an adaptive beamforming network, etc. It should be understood that the second-stage noise-suppression network 302 can correspond to another network or can employ different algorithms to generate noise-suppressed audio frames and that the above examples for merely illustrative. In general, the second-stage noise-suppression network 302 has a larger processing capacity than the noise-suppression networks 202 of the first power domain 290.

The audio frames 116 are provided to the second-stage noise-suppression network 302 and to the second-stage attention-pooling network 304. The second-stage noise-suppression network 302 may be configured to generate the second-stage noise-suppressed audio frame 310 based on the audio frames 116A, 116B. As a non-limiting example, the second-stage noise-suppression network 302 may perform a noise-suppression operation on the audio frames 116A, 116B and generate the second-stage noise-suppressed audio frame 310. The noise-suppression operation may be a high-power operation that includes filtering or suppressing noise components of the audio frames 116A, 116B and using the speech components of the audio frames 116A, 116B to generate the second-stage noise-suppressed audio frame 310. Thus, the second-stage noise-suppressed audio frame 310 may correspond to a speech frame (e.g., an enhanced speech frame or a noise-reduced speech signal) that includes the speech components of the audio frames 116A, 116B. The second-stage noise-suppressed audio frame 310 is provided to the second-stage attention-pooling network 304.

The output-noise suppressed audio frame 220 from the first power domain 290 may also be provided to the second-stage attention-pooling network 304. The second-stage attention-pooling network 304 may be configured to generate the second-stage output noise-suppressed audio frame 320 based on the audio frame 116A, the audio frame 116B, the output noise-suppressed audio frame 220, the second-stage output noise-suppressed audio frame 310, or a combination thereof. The second-stage attention-pooling network 304 may employ high-power attention-based pooling to assign different weights to each input in generating the second-stage output noise-suppressed audio frame 320. To illustrate, the second-stage attention-pooling network 304 may weight each incoming frame 116, 220, 310 based on a quality of speech. For example, if the second-stage noise-suppressed audio frame 310 has a relatively high quality of speech, the second-stage attention-pooling network 304 may assign a larger weight to the second-stage noise-suppressed audio frame 310 in generating the second-stage output noise-suppressed audio frame 320. By assigning larger weights to incoming frames having relatively high qualities of speech, the second-stage output noise-suppressed audio frame 320 generated by the second-stage attention-pooling network 304 may correspond to an enhanced speech frame (e.g., an enhanced speech signal). The second-stage output noised-suppressed audio frame 320 is provided to the second-stage inference network 306. Additionally, the second-stage output noise-suppressed audio frame 320 can be provided to other components of the one or more processors 190 for audio processing.

The second-stage inference network 306 may be configured to perform the classification task 230 on the second-stage output noise-suppressed audio frame 320 to verify the inference result 240. For example, the second-stage inference network 306 can perform the classification task 230 on the second-stage output noise-suppressed audio frame 320 to generate the inference result 340. If the inference result 340 matches (or substantially matches) the inference result 240 from the first power domain 290, the inference result 240 may be verified (e.g., the inference result 240 is determined to be accurate). According to one implementation, the inference result 340 may substantially match the inference result 240 if the confidence value is within a ten percent threshold. It should be understood that other thresholds may be used to determine whether inference results 240, 340 match and that the ten percent threshold is merely for illustrative purposes. It should be appreciated that similar techniques can be implemented in additional stages to verify the inference result 340.

The techniques described with respect to FIG. 3 enable selective activation of the high-efficiency, high-power domain 390 to verify the inference result 240. Because the second power domain 390 utilizes a larger amount of memory than the first power domain 290 and consumes a greater amount of power than the first power domain 290, selectively activating the second power domain 390 to verify results of the first power domain 290 can relax memory constraints and reduce power consumption (e.g., increase power efficiency).

Figure 4:
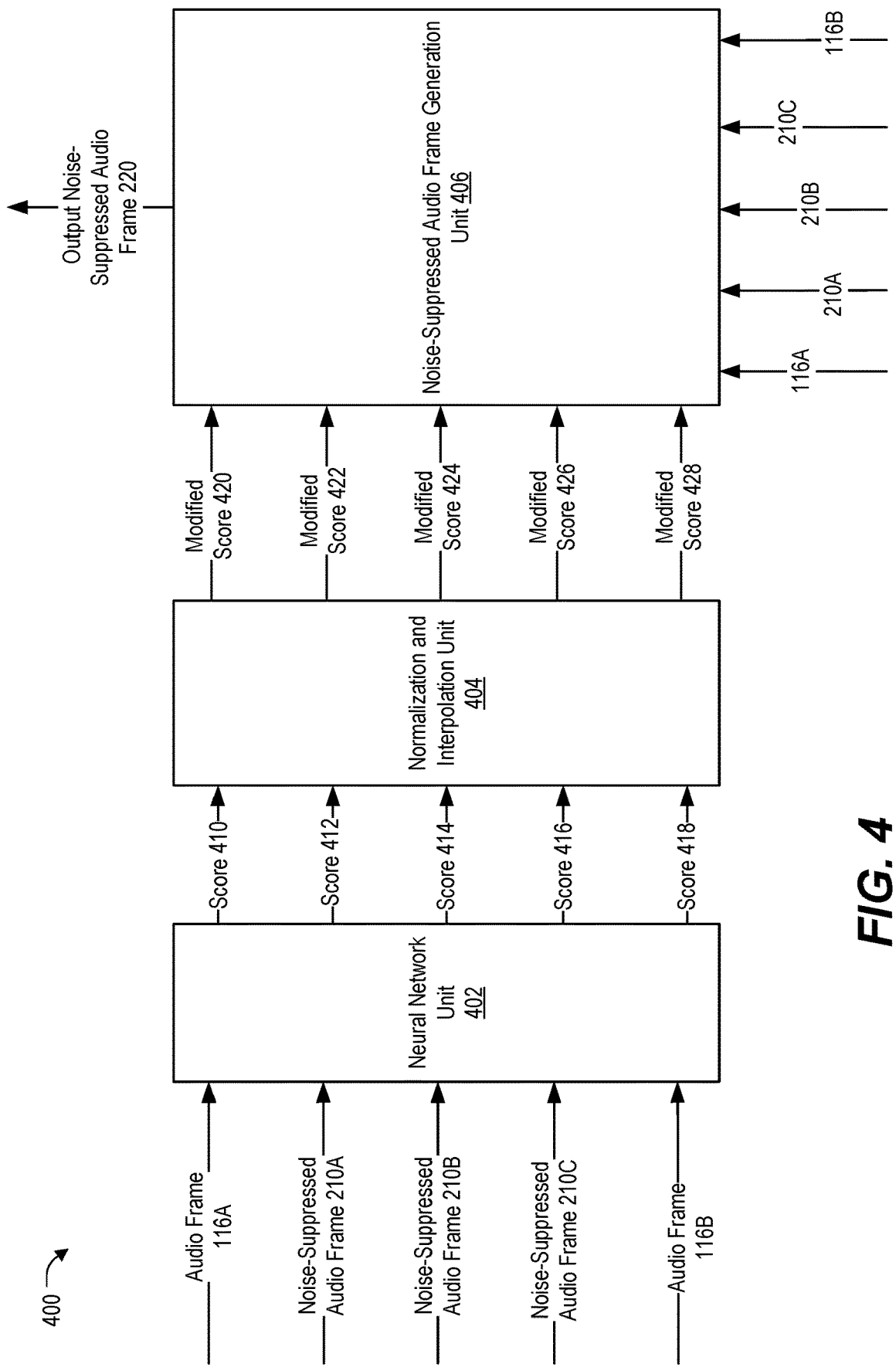
FIG. 4 is a diagram of an illustrative aspect of an attention-pooling network, in accordance with some examples of the present disclosure.

FIG. 4 depicts an illustrative implementation of an attention-pooling network 400. The attention-pooling network 400 can correspond to the attention-pooling network 204 or the second-stage attention-pooling network 304. It should be understood that other implementations and architectures can be used for attention-based pooling, as described herein, and that the implementation in FIG. 4 is merely for illustrative purposes and should not be construed as limiting. The attention-pooling network 400 includes a neural network unit 402, a normalization and interpolation unit 404, and a noise-suppressed audio frame generation unit 406.

The audio frames 116 and the noise-suppressed audio frames 210 are provided to the neural network unit 402. The neural network unit 402 may be configured to determine a score (e.g., a weight) for each incoming frame using deep-neural network algorithms. For example, the neural network unit 402 may determine a score 410 for the audio frame 116A from the microphone 110, a score 412 for the noise-suppressed audio frame 210A from the noise-suppression unit 202A, a score 414 for the noise-suppressed audio frame 210B from the noise-suppression unit 202B, a score 416 for the noise-suppressed audio frame 210C from the noise-suppression unit 202C, and a score 410 for the audio frame 116B from the microphone 120. As used herein, the "score" for an incoming frame may correspond to a value of a speech metric, such signal-to-noise ratio, of speech in the incoming frame. Incoming frames with a relatively high signal-to-noise ratio may be assigned a higher score than incoming frames with a relatively low signal-to-noise ratio. The neural network unit 402 may be trained, adjusted, and tuned based on the classification task 230, sample data, speech enhancement loss, classification loss, or a combination thereof, to determine the scores 410-418. The scores 410-418 are provided to the normalization and interpolation unit 404. The scores 410-418 of the incoming frames may be determined concurrently.

The normalization and interpolation unit 404 may be configured to perform a normalization and interpolation operation on the scores 410-418 to generate modified scores 420-428, respectively. For example, the normalization operation may ensure that the scores 410-418 are within a particular range of values. As a non-limiting example, if the scores 410-418 are scalar values and range from zero (0) to one-hundred (100), the normalization operation may proportionally adjust each scalar value such that the modified scores 420-428 range from zero (0) to one (1), or any other target range. The interpolation operation may interpolate the normalized scores to determine the modified scores 420-428. For example, the normalization and interpolation unit 404 may interpolate the normalized scores to estimate the modified scores 420-428. The modified scores 428 are provided to the noise-suppressed audio frame generation unit 406.

The noise-suppressed audio frame generation unit 406 may be configured to determine the weighted aggregation of incoming frames 116, 210. For example, the noise-suppressed audio frame generation unit 406 may apply the modified score 420 to the audio frame 116A, apply the modified score 422 to the noise-suppressed audio frame 210A, apply the modified score 424 to the noise-suppressed audio frame 210B, apply the modified score 426 to the noise-suppressed audio frame 210C, apply the modified score 428 to the audio frame 116B, and sum the resulting vectors to generate the output noise-suppressed audio frame 220.

Thus, the attention-pooling network 400 may leverage advantages of each noise-suppression network 202 to generate an enhanced speech signal (e.g., the output noise-suppressed audio frame 220) by performing attention-based pooling on the outputs of the individual noise-suppression networks 202. For example, the score deep-neural network unit 402 can assign heavier weights to the noise-suppressed audio frames 210 that have advantages or qualities that complement the classification task 230.

Figure 5:
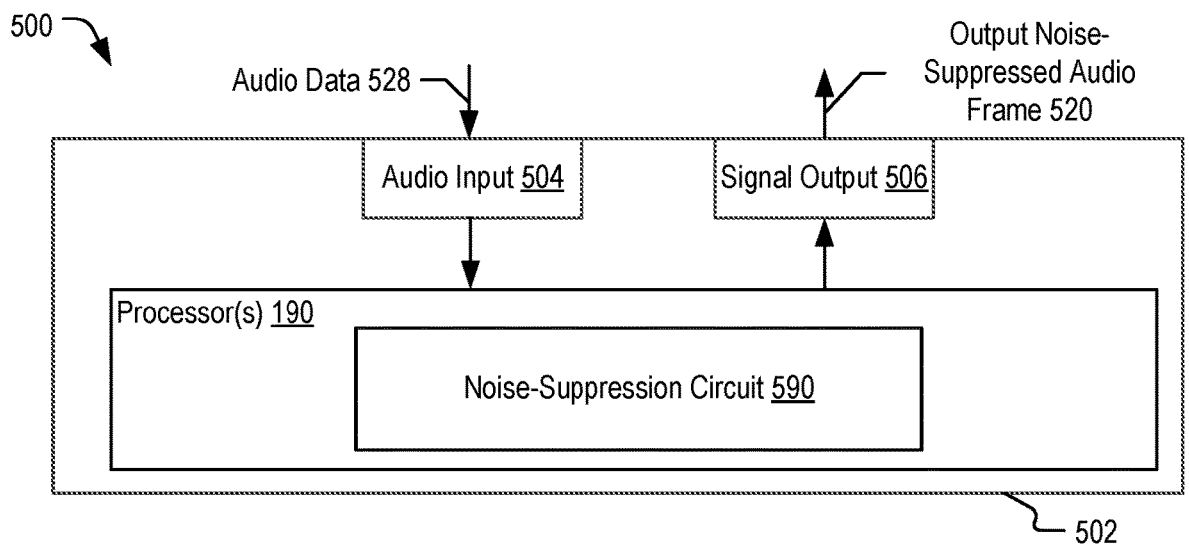
FIG. 5 illustrates an example of an integrated circuit that includes noise-suppression networks in tandem with an attention-pooling network for generating a noise-suppressed audio signal, in accordance with some examples of the present disclosure.

FIG. 5 depicts an implementation 500 of the device 102 as an integrated circuit 502 that includes noise-suppression networks in tandem with an attention-pooling network for generating a noise-suppressed audio signal. For example, the integrated circuit 502 includes the one or more processors 190. The one or more processors 190 include a noise-suppression circuit 590. The noise-suppression circuit 590 may include the components of the first power domain 290, components of the second power domain 390, or a combination thereof.

Figure 10:
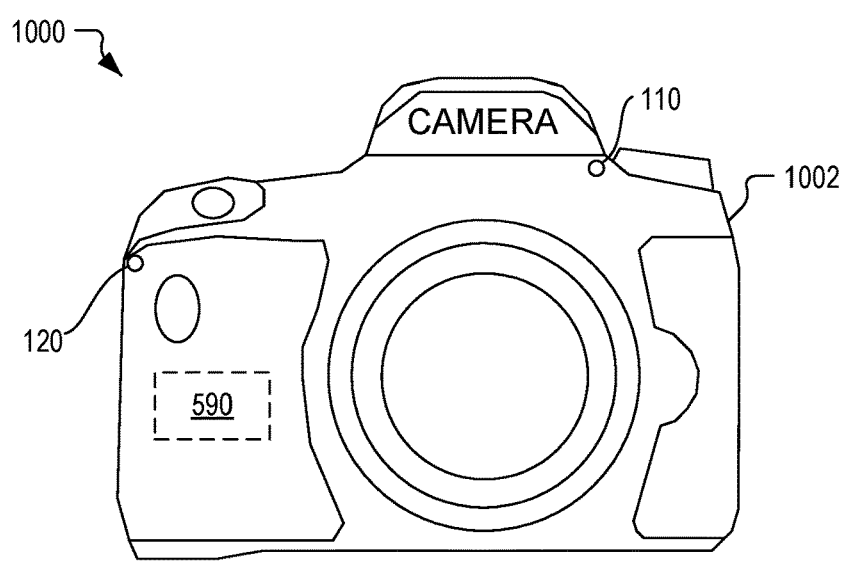
FIG. 10 is a diagram of a camera that includes noise-suppression networks in tandem with an attention-pooling network for generating a noise-suppressed audio signal, in accordance with some examples of the present disclosure.
Figure 11:
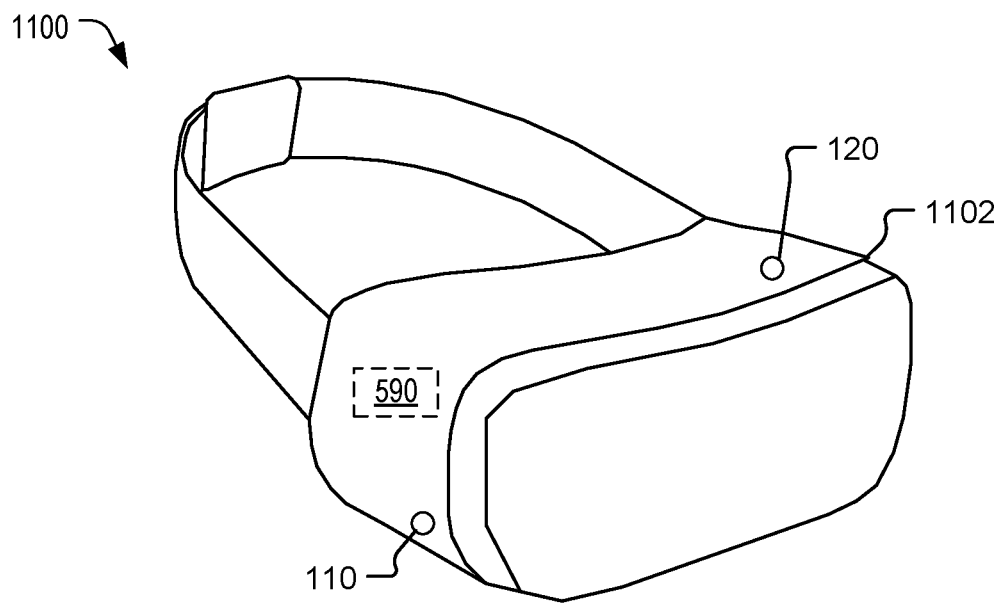
FIG. 11 is a diagram of a headset, such as a virtual reality, mixed reality, or augmented reality headset, that includes noise-suppression networks in tandem with an attention-pooling network for generating a noise-suppressed audio signal, in accordance with some examples of the present disclosure.
Figure 12:
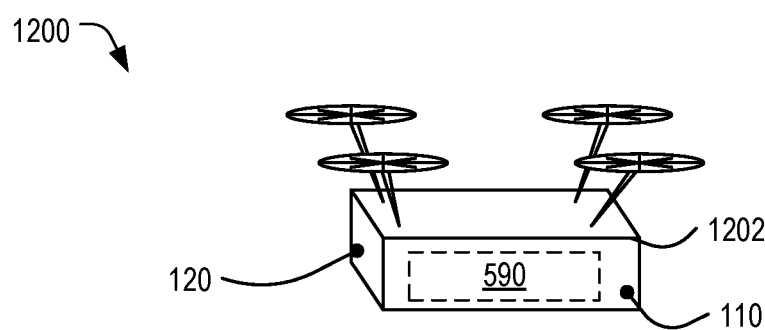
FIG. 12 is a diagram of a first example of a vehicle that includes noise-suppression networks in tandem with an attention-pooling network for generating a noise-suppressed audio signal, in accordance with some examples of the present disclosure.
Figure 13:
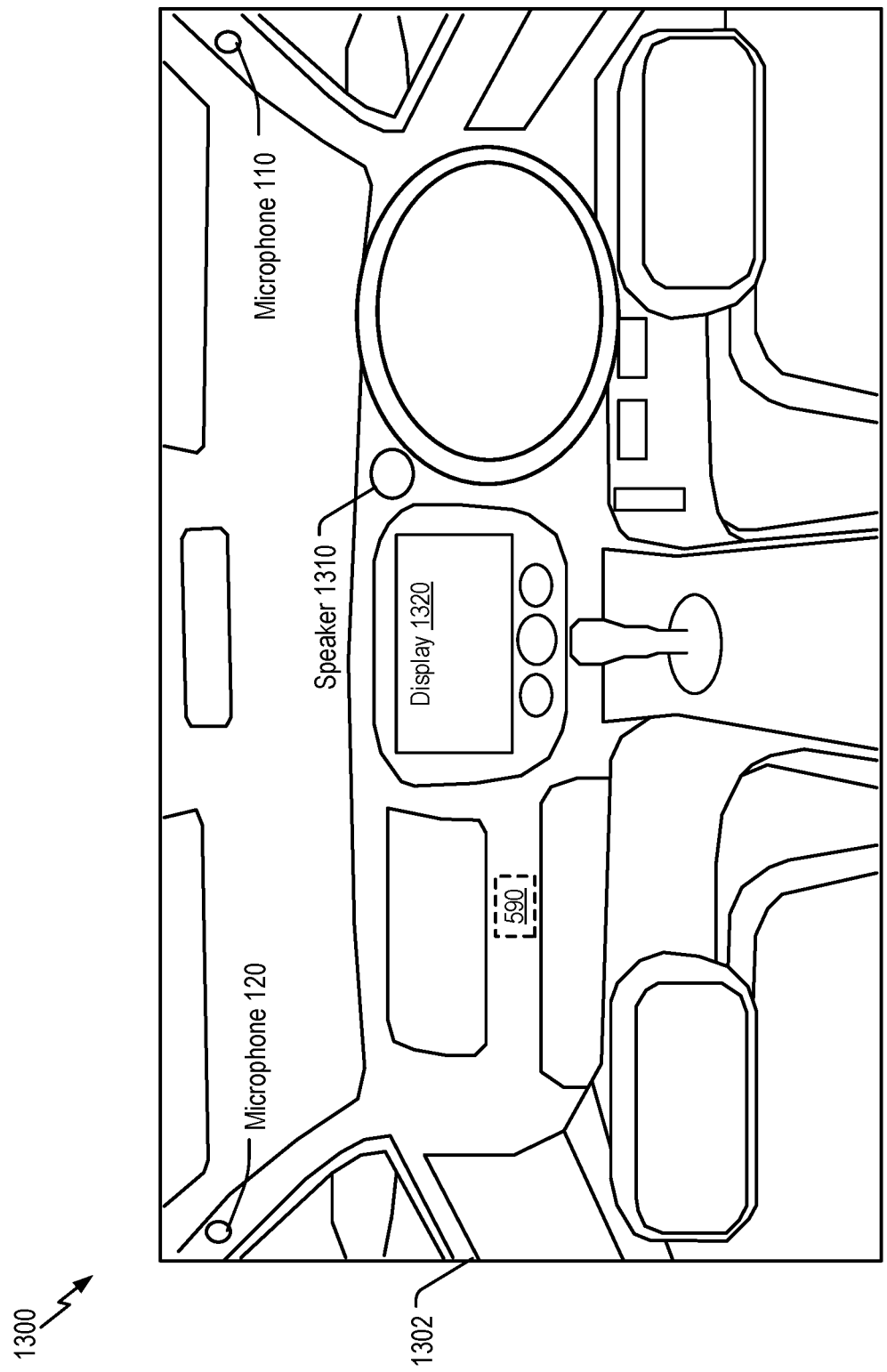
FIG. 13 is a diagram of a second example of a vehicle that includes noise-suppression networks in tandem with an attention-pooling network for generating a noise-suppressed audio signal, in accordance with some examples of the present disclosure.

The integrated circuit 502 also includes an audio input 504, such as one or more bus interfaces, to enable audio data 528 to be received for processing. The audio data 528 may correspond to the audio data 128, the output noise-suppressed audio frame 220, or a combination thereof. The integrated circuit 502 also includes a signal output 506, such as a bus interface, to enable sending of an output signal, such as an output noise-suppressed audio frame 520. The output-noise suppressed audio frame 520 may correspond to the output noise-suppressed audio frame 220, the second-stage output noise-suppressed audio frame 320, or a combination thereof. The integrated circuit 502 enables audio frame noise-suppression using progressive tandem networks as a component in a system that includes microphones, such as a mobile phone or tablet as depicted in FIG. 6, a headset as depicted in FIG. 7, a wearable electronic device as depicted in FIG. 8, a voice-controlled speaker system as depicted in FIG. 9, a camera as depicted in FIG. 10, a virtual reality headset, mixed reality headset, or an augmented reality headset as depicted in FIG. 11, or a vehicle as depicted in FIG. 12 or FIG. 13.

Figure 6:
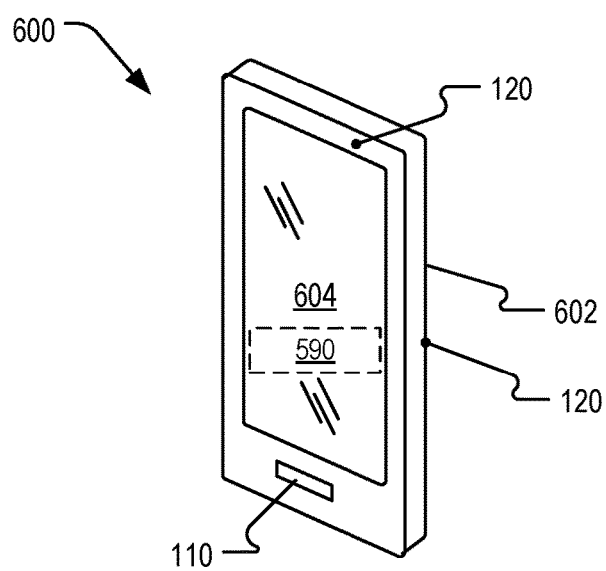
FIG. 6 is a diagram of a mobile device that includes noise-suppression networks in tandem with an attention-pooling network for generating a noise-suppressed audio signal, in accordance with some examples of the present disclosure.

FIG. 6 depicts an implementation 600 in which the device 102 is a mobile device 602, such as a phone or tablet, as illustrative, non-limiting examples. The mobile device 602 includes the first microphone 110 positioned to primarily capture speech of a user, one or more second microphones 120 positioned to primarily capture environmental sounds, and a display screen 604. The noise-suppression circuit 590 is integrated in the mobile device 602 and is illustrated using dashed lines to indicate internal components that are not generally visible to a user of the mobile device 602. In a particular example, the noise-suppression circuit 590 may operate to generate the output noise-suppressed audio frame 520, which is then processed to perform one or more operations at the mobile device 602, such as to launch a graphical user interface or otherwise display other information associated with the user's speech at the display screen 604 (e.g., via an integrated "smart assistant" application).

Figure 7:
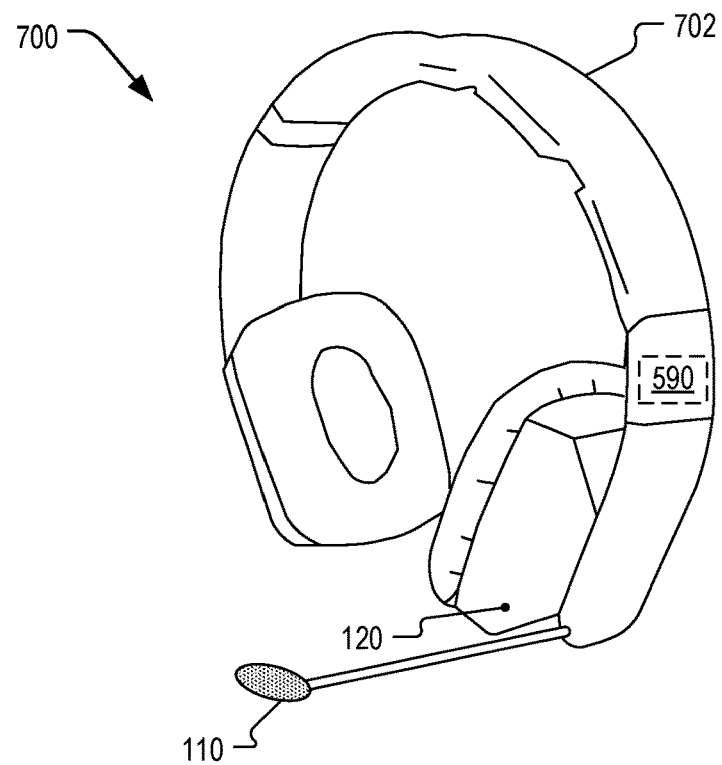
FIG. 7 is a diagram of a headset that includes noise-suppression networks in tandem with an attention-pooling network for generating a noise-suppressed audio signal, in accordance with some examples of the present disclosure.
Figure 8:
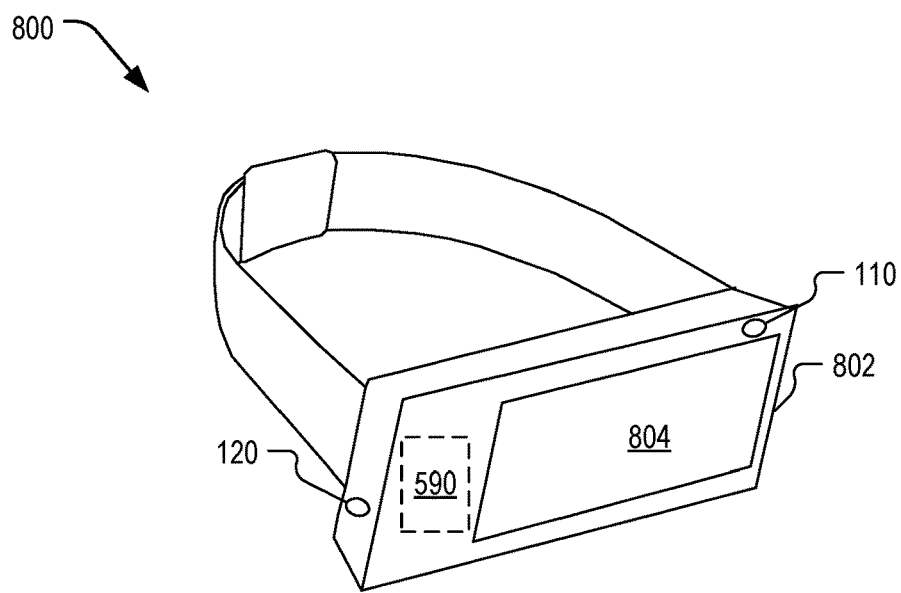
FIG. 8 is a diagram of a wearable electronic device that includes noise-suppression networks in tandem with an attention-pooling network for generating a noise-suppressed audio signal, in accordance with some examples of the present disclosure.

FIG. 7 depicts an implementation 700 in which the device 102 is a headset device 702. The headset device 702 includes the first microphone 110 positioned to primarily capture speech of a user and one or more second microphones 120 positioned to primarily capture environmental sounds. The noise-suppression circuit 590 is integrated in the headset device 702. In a particular example, the noise-suppression circuit 590 may operate to generate the output noise-suppressed audio frame 520, which may cause the headset device 702 to perform one or more operations at the headset device 702, to transmit the output noise-suppressed audio frame 520 to a second device (not shown), for further processing, or a combination thereof. As depicted in FIG. 7, the headset device 702 may be configured, when worn by a user, to position the first microphone 110 closer than the second microphone 120 to the user's mouth to capture utterances of the user at the first microphone 110 with greater intensity and less delay as compared to at the second microphone 120. FIG. 8 depicts an implementation 800 in which the device 102 is a wearable electronic device 802, illustrated as a "smart watch." The noise-suppression circuit 590, the first microphone 110, and one or more second microphones 120 are integrated into the wearable electronic device 802. In a particular example, the noise-suppression circuit 590 may operate to generate the output noise-suppressed audio frame 520, which is then processed to perform one or more operations at the wearable electronic device 802, such as to launch a graphical user interface or otherwise display other information associated with the user's speech at a display screen 804 of the wearable electronic device 802. To illustrate, the wearable electronic device 802 may include a display screen that is configured to display a notification based on user speech detected by the wearable electronic device 802.

Figure 9:
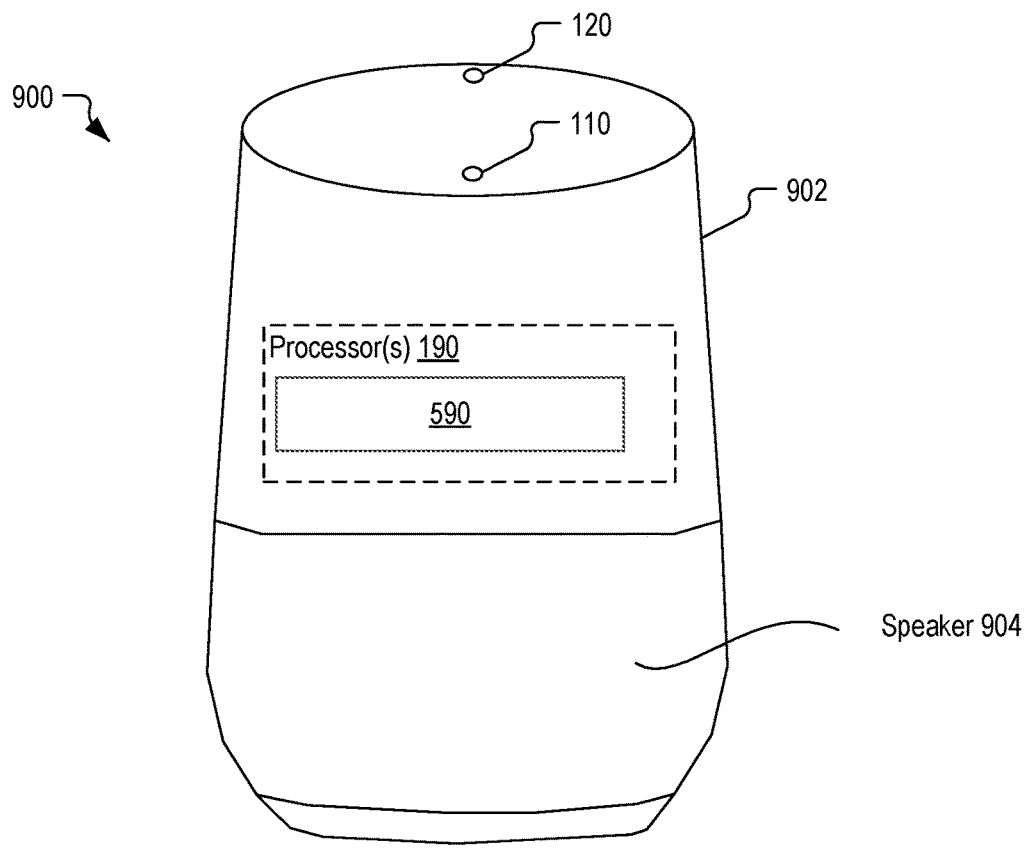
FIG. 9 is a diagram of a voice-controlled speaker system that includes noise-suppression networks in tandem with an attention-pooling network for generating a noise-suppressed audio signal, in accordance with some examples of the present disclosure.

FIG. 9 is an implementation 900 in which the device 102 is a wireless speaker and voice activated device 902. The wireless speaker and voice activated device 902 can have wireless network connectivity and is configured to execute an assistant operation. The processor 190 (including the noise-suppression circuit 590), the first microphone 110, the second microphone 120, or a combination thereof, are included in the wireless speaker and voice activated device 902. The wireless speaker and voice activated device 902 also includes a speaker 904. During operation, the noise-suppression circuit 590 may operate to generate the output noise-suppressed audio frame 520. Based on the output noise-suppressed audio frame 520, the processor 190 can determine whether a keyword was uttered. In response to a determination that a keyword was uttered, the wireless speaker and voice activated device 902 can execute assistant operations, such as via execution of an integrated assistant application. The assistant operations can include adjusting a temperature, playing music, turning on lights, etc. For example, the assistant operations are performed responsive to receiving a command after a keyword or key phrase (e.g., "hello assistant").

FIG. 10 depicts an implementation 1000 in which the device 102 is a portable electronic device that corresponds to a camera device 1002. The noise-suppression circuit 590, the first microphone 110, the second microphone 120, or a combination thereof, are included in the camera device 1002. During operation, the noise-suppression circuit 590 may operate to generate the output noise-suppressed audio frame 520. Based on the output noise-suppressed audio frame 520, a determination as to whether a keyword was uttered may be performed. In response to a determination that a keyword was uttered, the camera device 1002 can execute operations responsive to spoken user commands, such as to adjust image or video capture settings, image or video playback settings, or image or video capture instructions, as illustrative examples.

FIG. 11 depicts an implementation 1100 in which the device 102 includes a portable electronic device that corresponds to an extended reality ("XR") headset 1102, such as a virtual reality ("VR"), augmented reality ("AR"), or mixed reality ("MR") headset device. The noise-suppression circuit 590, the first microphone 110, the second microphone 120, or a combination thereof, are integrated into the headset 1102. In a particular aspect, the headset 1102 includes the first microphone 110 positioned to primarily capture speech of a user and the second microphone 120 positioned to primarily capture environmental sounds. The noise-suppression circuit 590 may operate to generate the output noise-suppressed audio frame 520 based on audio signals received from the first microphone 110 and the second microphone 120 of the headset 1102. A visual interface device is positioned in front of the user's eyes to enable display of augmented reality or virtual reality images or scenes to the user while the headset 1102 is worn. In a particular example, the visual interface device is configured to display a notification indicating user speech detected in the audio signal.

FIG. 12 depicts an implementation 1200 in which the device 102 corresponds to or is integrated within a vehicle 1202, illustrated as a manned or unmanned aerial device (e.g., a package delivery drone). The noise-suppression circuit 590, the first microphone 110, the second microphone 120, or a combination thereof, are integrated into the vehicle 1202. The noise-suppression circuit 590 may operate to generate the output noise-suppressed audio frame 520 based on audio signals received from the first microphone 110 and the second microphone 120 of the vehicle 1202, such as for delivery instructions from an authorized user of the vehicle 1202.

FIG. 13 depicts another implementation 1300 in which the device 102 corresponds to, or is integrated within, a vehicle 1302, illustrated as a car. The vehicle 1302 includes the noise-suppression circuit 590. The vehicle 1302 also includes the first microphone 110 and the second microphone 120. The first microphone 110 is positioned to capture utterances of an operator of the vehicle 1302. The noise-suppression circuit 590 may operate to generate the output noise-suppressed audio frame 520 based on audio signals received from the first microphone 110 and the second microphone 120 of the vehicle 1302. In some implementations, tasks can be performed based on an audio signal received from interior microphones (e.g., the first microphone 110 and the second microphone 120), such as for a voice command from an authorized passenger. In a particular implementation, the output noise-suppressed audio frame 520 can be used to verify whether one or more keywords was uttered. One or more operations of the vehicle 1302 may be initiated based on one or more keywords (e.g., "unlock", "start engine", "play music", "display weather forecast", or another voice command) detected, such as by providing feedback or information via a display 1320 or one or more speakers (e.g., a speaker 1310).

Figure 14:
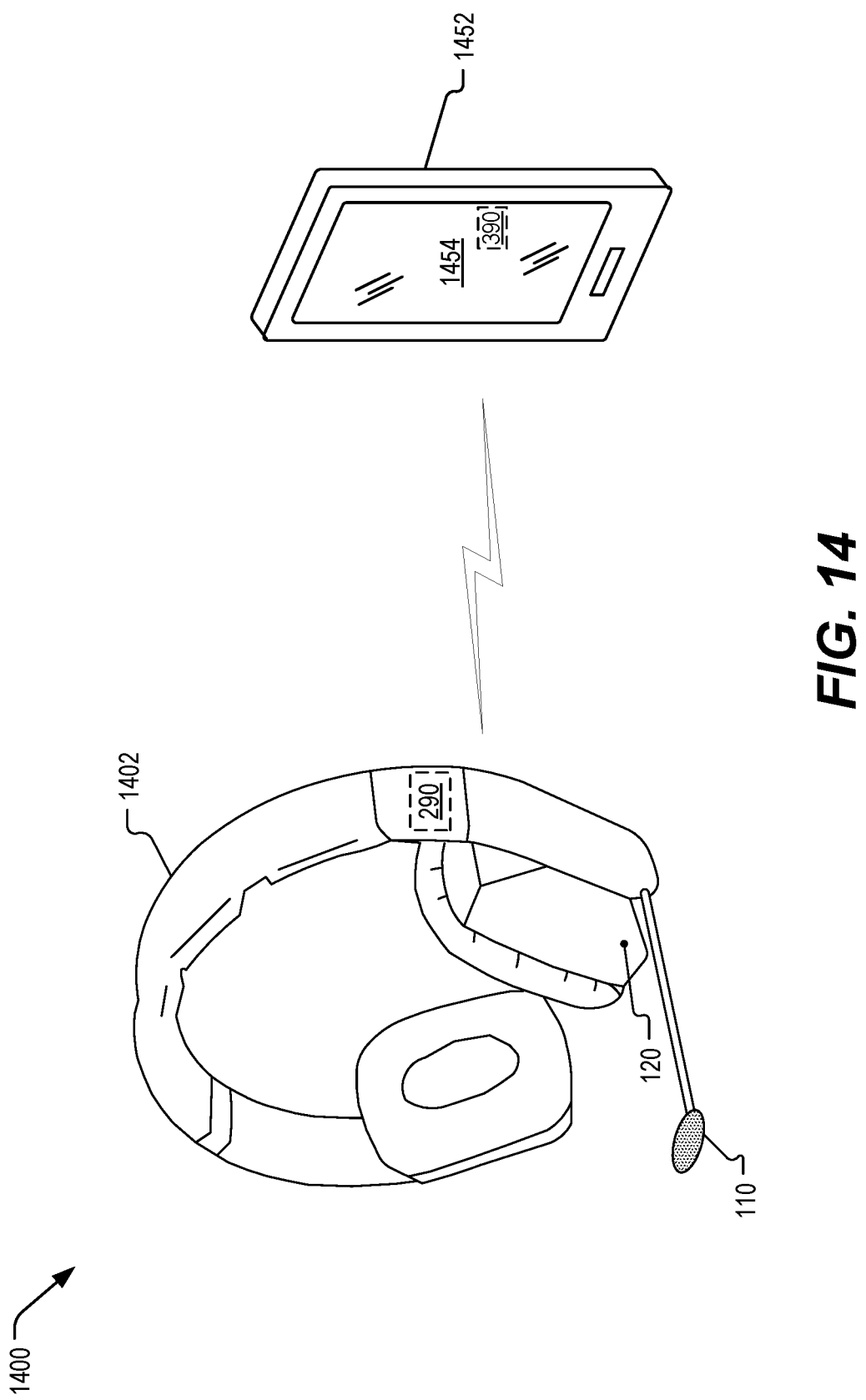
FIG. 14 is a diagram of an auxiliary device paired with a computing device, in accordance with some examples of the present disclosure.

FIG. 14 depicts a diagram 1400 of an auxiliary device paired with a computing device. For example, FIG. 14 depicts a headset device 1402 (e.g., an auxiliary device) paired with a mobile device 1452 (e.g., a computing device). The headset device 1402 includes the first microphone 110 positioned to primarily capture speech of a user and the second microphone 120 positioned to primarily capture environmental sounds. Components of the first power domain 290 are integrated in the headset device 1402. The mobile device 1452 includes a display screen 1454. Components of the second power domain 390 are integrated into the mobile device 1452. During operation, the components of the first power domain 290, such as the inference network 206, may perform a classification task, such as keyword spotting, using a relatively small amount of power and resources. If a keyword is spotted or detected, the headset device 1402 can send a wake-up signal, such as the wake-up signal 370, to the second power domain 390 integrated into the mobile device 1452. Upon receiving the wake-up signal, the components of the second power domain 390 transition from a low-power mode to an active mode and may verify whether a keyword was uttered, as described above. It should be understood that the devices depicted in FIGS. 5-13 and other devices can be configured in a similar manner. That is, a first device having components of the first power domain 290 can communicate with a second device, such as a server, having components of the second power domain 390. The connection between the first device can be established through local networks, through wide area networks, or through internet protocols.

Figure 15:
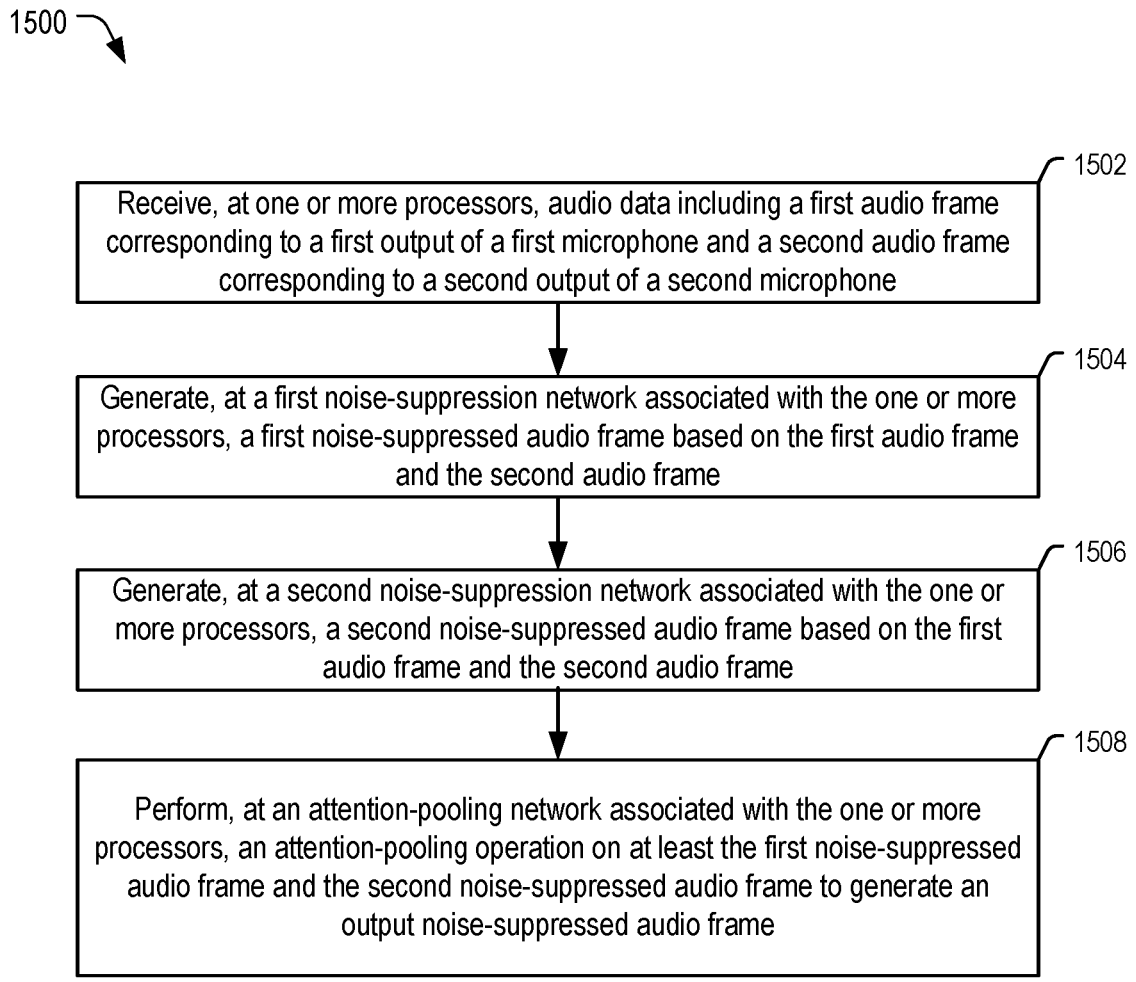
FIG. 15 is a diagram of a particular implementation of a method of generating a noise-suppressed audio signal using progressive tandem networks, in accordance with some examples of the present disclosure.

Referring to FIG. 15, a particular implementation of a method 1500 of suppressing noise is shown. In a particular aspect, one or more operations of the method 1500 are performed by at least one of the noise-suppression networks 202, the attention-pooling network 204, the inference network 206, the second-stage noise-suppression network 302, the second-stage attention-pooling network 304, the second inference network 306, the processor 190, the device 102, the system 100 of FIG. 1, or a combination thereof.

The method 1500 includes receiving, at one or more processors, audio data including a first audio frame corresponding to a first output of a first microphone and a second audio frame corresponding to a second output of a second microphone, at block 1502. For example, referring to FIG. 1, the one or more processors 190 may receive the audio data 128. In particular, the audio data 128 may include the audio frame 116A corresponding to the first output 112 of the microphone 110 and the audio frame 116B corresponding to the second output 122 of the microphone 120.

The method 1500 also includes generating, at a first noise-suppression network associated with the one or more processors, a first noise-suppressed audio frame based on the first audio frame and the second audio frame, at block 1504. For example, referring to FIG. 2, the noise-suppression network 202A may generate the noise-suppressed audio frame 210A based on the audio data 128 (e.g., the audio frames 116).

The method 1500 also includes generating, at a second noise-suppression network associated with the one or more processors, a second noise-suppressed audio frame based on the first audio frame and the second audio frame, at block 1506. For example, referring to FIG. 2, the noise-suppression network 202B may generate the noise-suppressed audio frame 210B based on the audio data 128 (e.g., the audio frames 116).

The method 1500 also includes performing, at an attention-pooling network associated with the one or more processors, an attention-pooling operation on at least the first noise-suppressed audio frame and the second noise-suppressed audio frame to generate an output noise-suppressed audio frame, at block 1508. As used herein, an "attention-pooling operation" is an operation that integrates data associated with a plurality of frames into a single frame by weighting the data in each frame of the plurality of frames. For example, referring to FIG. 2, the attention-pooling network 204 may perform attention-based pooling on the noise-suppressed audio frame 210A and the noise-suppressed audio frame 210B to generate the output noise-suppressed audio frame 220.

According to one implementation, the method 1500 includes performing, at an inference network associated with the one or more processors, a classification task on the output noise-suppressed audio frame to generate an inference result. For example, referring to FIG. 2, the inference network 206 may perform the classification task 230 on the output noise-suppressed audio frame 220 to generate the inference result 240. The classification task 230 may correspond to at least one of a keyword spotting task, an automatic speech recognition task, an utterance verification task, a task associated with a voice call, etc.

According to one implementation, the method 1500 includes determining the classification task associated with the inference network and training, based on the classification task, at least one of the first noise-suppression network, the second noise-suppression network, or the attention-pooling network. For example, referring to FIG. 2, joint training may be undergone whereby the noise-suppression networks 202 and the attention-pooling network 204 are trained based on sample data and based on an output of the inference network 206. To illustrate, the classification task 230 can be used to provide additional training to the noise-suppression networks 202 and the attention-pooling network 204.

According to one implementation of the method 1500, a first power domain may operate at a first power level and a second power domain may operate at a second power level that is greater than the first power level. For example, referring to FIG. 1, the first power domain 290 may operate at a low power level and the second power domain 390 may operate at a high-power level. The second power domain 390 may be selectively activated to verify the inference result 240 of the inference network 206. For example, the second power domain 390 may be activated to verify the inference result 240 in response to a determination that the inference result 240 indicates a positive result. Thus, if the classification task 230 corresponds to a keyword spotting task and the inference result 240 indicates detection of a keyword, the wake-up signal 370 may be provided to activate the second power domain 390 to verify whether the keyword was uttered.

The method 1500 of FIG. 15 enables advantages of each noise-suppression network 202A, 202B, 202C to be leveraged to generate an enhanced speech signal (e.g., the output noise-suppressed audio frame 220) that can be used to perform the classification task 230. For example, by performing attention-based pooling on the outputs of the individual noise-suppression networks 202, the attention-pooling network 204 can assign heavier weights to outputs of the noise-suppression networks 202 utilizing algorithms (or noise-suppression techniques) that complement the classification task 230 and can assign lighter weights to outputs of the noise-suppression networks 202 utilizing algorithms that would not particularly benefit the classification task 230.

The method 1500 also enables selective activation of the high-power domain 390 to verify the classification of inference network 206 associated with the first power domain 290. Because the second power domain 390 utilizes a larger amount of memory than the first power domain 290 and consumes a greater amount of power than the first power domain 290, selectively activating the second power domain 390 to verify results of the first power domain 290 can relax memory constraints and reduce power consumption (e.g., increase power efficiency).

The method 1500 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1500 may be performed by a processor that executes instructions, such as described with reference to FIG. 16.

Figure 16:
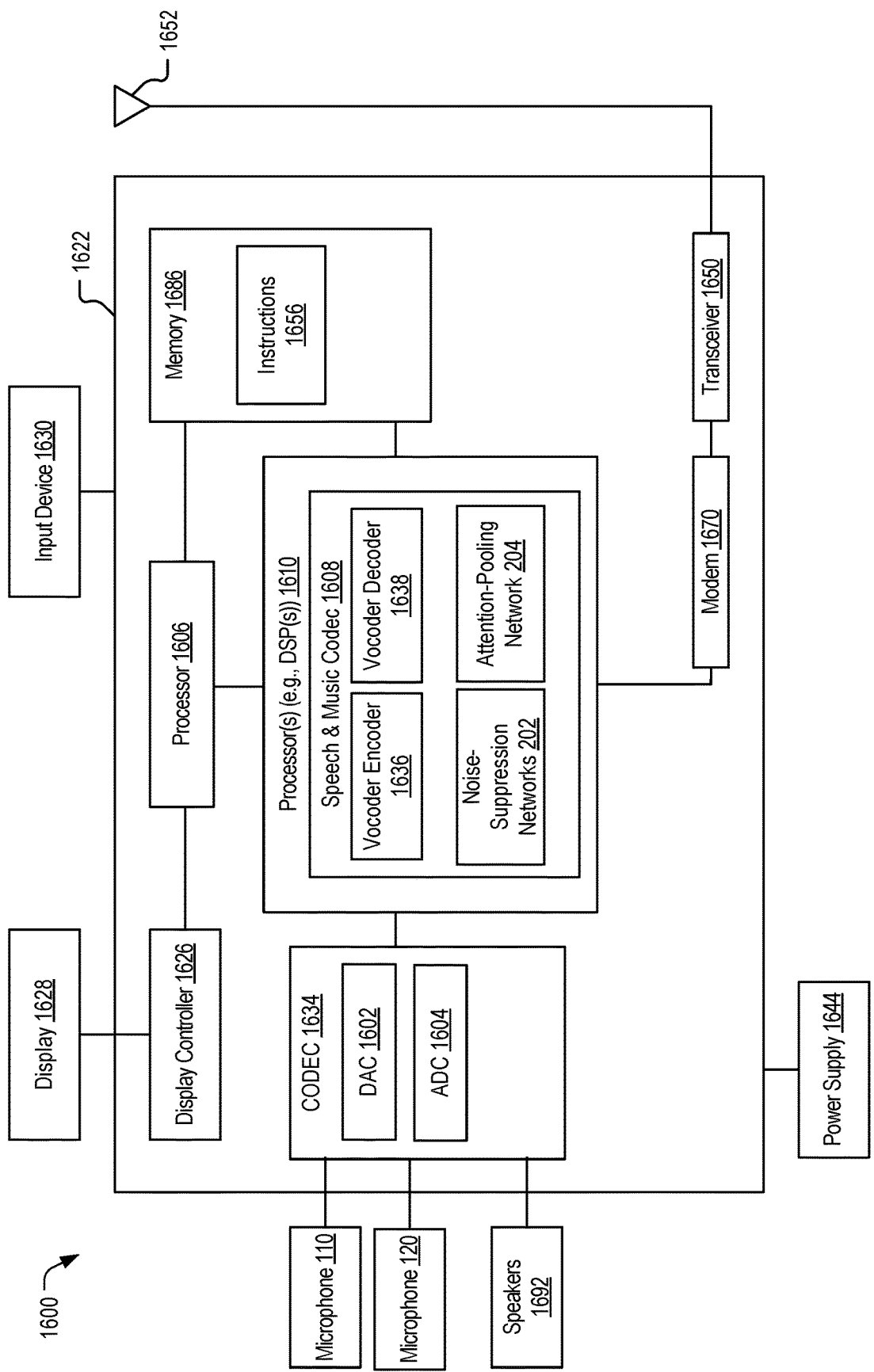
FIG. 16 is a block diagram of a particular illustrative example of a device that is operable to generate a noise-suppressed audio signal using progressive tandem networks, in accordance with some examples of the present disclosure.

Referring to FIG. 16, a block diagram of a particular illustrative implementation of a device is depicted and generally designated 1600. In various implementations, the device 1600 may have more or fewer components than illustrated in FIG. 16. In an illustrative implementation, the device 1600 may correspond to the device 102. In an illustrative implementation, the device 1600 may perform one or more operations described with reference to FIGS. 1-15.

In a particular implementation, the device 1600 includes a processor 1606 (e.g., a central processing unit (CPU)). The device 1600 may include one or more additional processors 1610 (e.g., one or more DSPs). In a particular aspect, the processor(s) 190 of FIG. 1 corresponds to the processor 1606, the processors 1610, or a combination thereof. The processors 1610 may include a speech and music coder-decoder (CODEC) 1608 that includes a voice coder ("vocoder") encoder 1636, a vocoder decoder 1638, the noise-suppression networks 202, the attention-pooling network 204, or a combination thereof. Although not illustrated in FIG. 16, the speech and music CODEC 1608 may also include other components of the first power domain 290, components of the second power domain 390, or both.

The device 1600 may include a memory 1686 and a CODEC 1634. The memory 1686 may include instructions 1656, that are executable by the one or more additional processors 1610 (or the processor 1606) to implement the functionality described with reference to the noise-suppression networks 202, the attention-pooling network 204, or both. The device 1600 may include a modem 1670 coupled, via a transceiver 1650, to an antenna 1652. The modem 1670 may be configured to transmit a signal, such as the output noise-suppressed audio frame 220, to a second device (not shown). For example, if the output noise-suppressed audio frame 220 is generated during a voice call, the modem 1670 may transmit the output noise-suppressed audio frame 220 to a receiver device via the transceiver 1650 and the antenna 1652.

The device 1600 may include a display 1628 coupled to a display controller 1626. A speaker 1692, the first microphone 110, and the second microphone 120 may be coupled to the CODEC 1634. The CODEC 1634 may include a digital-to-analog converter (DAC) 1602, an analog-to-digital converter (ADC) 1604, or both. In a particular implementation, the CODEC 1634 may receive analog signals from the first microphone 110 and the second microphone 120, convert the analog signals to digital signals using the analog-to-digital converter 1604, and provide the digital signals to the speech and music codec 1608. The speech and music codec 1608 may process the digital signals, and the digital signals may further be processed by the noise-suppression networks 202 and the attention-pooling network 204. In a particular implementation, the speech and music codec 1608 may provide digital signals to the CODEC 1634. The CODEC 1634 may convert the digital signals to analog signals using the digital-to-analog converter 1602 and may provide the analog signals to the speaker 1692.

In a particular implementation, the device 1600 may be included in a system-in-package or system-on-chip device 1622. In a particular implementation, the memory 1686, the processor 1606, the processors 1610, the display controller 1626, the CODEC 1634, and the modem 1670 are included in a system-in-package or system-on-chip device 1622. In a particular implementation, an input device 1630 and a power supply 1644 are coupled to the system-on-chip device 1622. Moreover, in a particular implementation, as illustrated in FIG. 16, the display 1628, the input device 1630, the speaker 1692, the first microphone 110, the second microphone 120, the antenna 1652, and the power supply 1644 are external to the system-on-chip device 1622. In a particular implementation, each of the display 1628, the input device 1630, the speaker 1692, the first microphone 110, the second microphone 120, the antenna 1652, and the power supply 1644 may be coupled to a component of the system-on-chip device 1622, such as an interface (e.g., the first input interface 114 or the second input interface 124) or a controller.

The device 1600 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a vehicle, a computing device, a communication device, an internet-of-things (IoT) device, a virtual reality (VR) device, a base station, a mobile device, or any combination thereof.

In conjunction with the described implementations, an apparatus includes means for receiving audio data including a first audio frame corresponding to a first output of a first microphone and a second audio frame corresponding to a second output of a second microphone. For example, the means for receiving can correspond to the first input interface 114, the second input interface 124, the noise-suppression networks 202, the attention-pooling network 204, the processor(s) 190, the one or more processors 1610, one or more other circuits or components configured to receive audio data including a first audio frame corresponding to a first output of a first microphone and a second audio frame corresponding to a second output of a second microphone, or any combination thereof.

The apparatus also includes means for generating a first noise-suppressed audio frame based on the audio data. For example, the means for generating the first noise-suppressed audio frame can correspond to the noise-suppression networks 202, the processor(s) 190, the one or more processors 1610, one or more other circuits or components configured to generate the first noise-suppressed audio frame, or any combination thereof.

The apparatus further includes means for generating a second noise-suppressed audio frame based on the audio data. For example, the means for generating the second noise-suppressed audio frame can correspond to the noise-suppression networks 202, the processor(s) 190, the one or more processors 1610, one or more other circuits or components configured to generate the second noise-suppressed audio frame, or any combination thereof.

The apparatus also includes means for performing an attention-pooling operation on at least the first noise-suppressed audio frame and the second noise-suppressed audio frame to generate an output noise-suppressed audio frame. For example, the means for performing the attention-pooling operation can correspond to the attention-pooling network 204, the processor(s) 190, the one or more processors 1610, one or more other circuits or components configured to perform the attention-pooling operation, or any combination thereof.

In some implementations, a non-transitory computer-readable medium (e.g., a computer-readable storage device, such as the memory 1686) includes instructions (e.g., the instructions 1656) that, when executed by one or more processors (e.g., the one or more processors 1610 or the processor 1606), cause the one or more processors to receive audio data (e.g., the audio data 128) including a first audio frame (e.g., the audio frame 116A) corresponding to a first output of a first microphone (e.g., the first microphone 110) and a second audio frame (e.g., the audio frame 116B) corresponding to a second output of a second microphone (e.g., the second microphone 120). The instructions, when executed by the one or more processors, also cause the one or more processors to generate, at a first noise-suppression network (e.g., the noise-suppression network 202A), a first noise-suppressed audio frame (e.g., the noise-suppressed audio frame 210A) based on the audio data. The instructions, when executed by the one or more processors, also cause the one or more processors to generate, at a second noise-suppression network (e.g., the noise-suppression network 202B), a second noise-suppressed audio frame (e.g., the noise-suppressed audio frame 210B) based on the audio data. The instructions, when executed by the one or more processors, also cause the one or more processors to perform, at an attention-pooling network (e.g., the attention-pooling network 204), an attention-pooling operation on at least the first noise-suppressed audio frame and the second noise-suppressed audio frame to generate an output noise-suppressed audio frame (e.g., the output noise-suppressed audio frame 220).

This disclosure includes the following examples.

Example 1. A device comprising: a memory configured to store instructions; and one or more processors configured to execute the instructions to: receive audio data including a first audio frame corresponding to a first output of a first microphone and a second audio frame corresponding to a second output of a second microphone; provide the audio data to a first noise-suppression network and to a second noise-suppression network, the first noise-suppression network configured to generate a first noise-suppressed audio frame based on the audio data, and the second noise-suppression network configured to generate a second noise-suppressed audio frame based on the audio data; and provide the first noise-suppressed audio frame and the second noise-suppressed audio frame to an attention-pooling network, the attention-pooling network configured to generate an output noise-suppressed audio frame based at least on the first noise-suppressed audio frame and the second noise-suppressed audio frame Example 2. The device of example 1, further comprising the first microphone and the second microphone, wherein the first microphone and the second microphone are coupled to the one or more processors.

Example 3. The device of example 1 or example 2, wherein the one or more processors are further configured to: provide the output noise-suppressed audio frame to an inference network associated with a classification task, the inference network configured to perform the classification task on the output noise-suppressed audio frame to generate an inference result.

Example 4. The device of any of examples 1 to 3, wherein the classification task corresponds to at least one of a keyword spotting task, an automatic speech recognition task, or an utterance verification task.

Example 5. The device of any of examples 1 to 4, wherein the one or more processors are further configured to: determine the classification task associated with the inference network; and tune, based on the classification task, at least one of the first noise-suppression network, the second noise-suppression network, or the attention-pooling network.

Example 6. The device of any of examples 1 to 5, wherein the one or more processors further comprise: a first power domain configured to operate at a first power level, the first power domain comprising the first noise-suppression network, the second noise-suppression network, the attention-pooling network, and the inference network; and a second power domain configured to operate at a second power level that is greater than the first power level, the second power domain selectively activated to verify the inference result.

Example 7. The device of any of examples 1 to 6, wherein the second power domain is activated to verify the inference result in response to a determination that the inference result indicates a positive result.

Example 8. The device of any of examples 1 to 7, wherein the second power domain comprises: a second-stage noise-suppression network configured to generate a second-stage noise-suppressed audio frame based on the audio data; a second-stage attention-pooling network configured to generate a second-stage output noise-suppressed audio frame based at least on the output noise-suppressed audio frame, the audio data, and the second-stage noise-suppressed audio frame; and a second inference network configured to perform the classification task on the second-stage output noise-suppressed audio frame to verify the inference result.

Example 9. The device of any of examples 1 to 8, wherein the first power domain is integrated in an auxiliary device, and wherein the second power domain is integrated into a computing device that is paired with the auxiliary device.

Example 10. The device of any of examples 1 to 9, wherein the auxiliary device comprises a headset.

Example 11. The device of any of examples 1 to 10, wherein the one or more processors are further configured to: provide the audio data to a third noise-suppression network, wherein the third noise-suppression network is configured to generate a third noise-suppressed audio frame based on the audio data; and provide the third noise-suppressed audio frame to the attention-pooling network, wherein the output noise-suppressed audio frame generated by the attention-pooling network is further based on the third noise-suppressed audio frame.

Example 12. The device of any of examples 1 to 11, wherein the first noise-suppression network corresponds to a speech generation network, wherein the second noise-suppression network corresponds to a generalized eigenvalue network, and wherein the third noise-suppression network correspond to an adaptive beamforming network.

Example 13. The device of any of examples 1 to 12, wherein the speech generation network is configured to generate a voice activity detection signal that indicates a first set of frequency ranges associated with the audio data that are speech-dominant or indicates a second set of frequency ranges associated with the audio data that are noise-dominant.

Example 14. The device of any of examples 1 to 13, wherein at least one of the speech generation network or the eigenvalue network is configured to perform direction-of-arrival processing to determine a direction-of-arrival of incoming speech and a direction-of-arrival of incoming noise, and wherein parameters of the adaptive beamforming network are adjusted based on an output of the direction-of-arrival processing.

Example 15. The device of any of examples 1 to 14, wherein the one or more processors are further configured to: provide the audio data to the attention-pooling network, wherein the output noise-suppressed audio frame generated by the attention-pooling network is further based on the audio data provided to the attention-pooling network.

Example 16. The device of any of examples 1 to 15, further comprising a modem coupled to the one or more processors, the modem configured to transmit the output noise-suppressed audio frame to a second device.

Example 17. The device of any of examples 1 to 16, wherein the one or more processors are integrated in a headset device that includes the first microphone and the second microphone, and wherein the headset device is configured, when worn by a user, to position the first microphone closer than the second microphone to the user's mouth to capture utterances of the user at the first microphone with greater intensity and less delay as compared to at the second microphone.

Example 18. The device of any of examples 1 to 17, wherein the one or more processors are integrated in at least one of a mobile phone, a tablet computer device, a wearable electronic device, a camera device, a virtual reality headset, or an augmented reality headset.

Example 19. The device of any of examples 1 to 18, wherein the one or more processors are integrated in a vehicle, the vehicle further including the first microphone and the second microphone, and wherein the first microphone is positioned to capture utterances of an operator of the vehicle.

Example 20. The device of any of examples 1 to 19, wherein the one or more processors are further configured to determine a speech enhancement loss associated with the output noise-suppressed audio frame; determine a classification loss associated with the inference result; and determine a joint loss based on the speech enhancement loss and the classification loss, wherein the training is based on the joint loss.

Example 21. The device of any of examples 1 to 20, wherein the one or more processors are further configured to generate, at a first power domain, a wake-up signal in response to a determination that the inference result indicates a positive result, wherein the first power domain includes the first noise-suppression network, the second noise-suppression network, the attention-pooling network, and the inference network; and transition, based on the wake-up signal, a second power domain from a low-power mode to an active mode, wherein the second power domain verifies the inference result while in the active mode.

Example 22. A method of suppressing noise in an audio frame, the method comprising: receiving, at one or more processors, audio data including a first audio frame corresponding to a first output of a first microphone and a second audio frame corresponding to a second output of a second microphone; generating, at a first noise-suppression network associated with the one or more processors, a first noise-suppressed audio frame based on the first audio frame and the second audio frame; generating, at a second noise-suppression network associated with the one or more processors, a second noise-suppressed audio frame based on the first audio frame and the second audio frame; and performing, at an attention-pooling network associated with the one or more processors, an attention-pooling operation on at least the first noise-suppressed audio frame and the second noise-suppressed audio frame to generate an output noise-suppressed audio frame.

Example 23. The method of example 22, further comprising performing, at an inference network associated with the one or more processors, a classification task on the output noise-suppressed audio frame to generate an inference result.

Example 24. The method of any of examples 22 to 23, further comprising training, based on the classification task, at least one of the first noise-suppression network, the second noise-suppression network, or the attention-pooling network.

Example 25. The method of any of examples 22 to 24, further comprising: determining a speech enhancement loss associated with the output noise-suppressed audio frame; determining a classification loss associated with the inference result; and determining a joint loss based on the speech enhancement loss and the classification loss, wherein the training is based on the joint loss.

Example 26. The method of any of examples 22 to 25, further comprising: generating, at a first power domain associated with the one or more processors, a wake-up signal in response to a determination that the inference result indicates a positive result, wherein the first power domain includes the first noise-suppression network, the second noise-suppression network, the attention-pooling network, and the inference network; and transitioning, based on the wake-up signal, a second power domain from a low-power mode to an active mode, wherein the second power domain verifies the inference result while in the active mode.

Example 27. The method of any of examples 22 to 26, further comprising performing a classification task on the output noise-suppressed audio frame to generate an inference result.

Example 28. The method of any of examples 22 to 27, wherein the classification task corresponds to at least one of a keyword spotting task, an automatic speech recognition task, or an utterance verification task.

Example 29. The method of any of examples 22 to 28, further comprising determining the classification task associated with the inference network; and tuning, based on the classification task, at least one of the first noise-suppression network, the second noise-suppression network, or the attention-pooling network.

Example 30. The method of any of examples 22 to 29, further comprising operating a first power domain at a first power level, the first power domain comprising the first noise-suppression network, the second noise-suppression network, the attention-pooling network, and the inference network; and operating a second power domain at a second power level that is greater than the first power level, the second power domain selectively activated to verify the inference result.

Example 31. The method of any of examples 22 to 30, wherein the second power domain is activated to verify the inference result in response to a determination that the inference result indicates a positive result.

Example 32. The method of any of examples 22 to 31, wherein the second power domain comprises: a second-stage noise-suppression network configured to generate a second-stage noise-suppressed audio frame based on the audio data; a second-stage attention-pooling network configured to generate a second-stage output noise-suppressed audio frame based at least on the output noise-suppressed audio frame, the audio data, and the second-stage noise-suppressed audio frame; and a second inference network configured to perform the classification task on the second-stage output noise-suppressed audio frame to verify the inference result.

Example 33. The method of any of examples 22 to 32, wherein the first power domain is integrated in an auxiliary device, and wherein the second power domain is integrated into a computing device that is paired with the auxiliary device.

Example 34. The method of any of examples 22 to 33, wherein the auxiliary device comprises a headset.

Example 35. The method of any of examples 22 to 34, further comprising generating, at third noise-suppression network, a third noise-suppressed audio frame based on the audio data; and providing the third noise-suppressed audio frame to the attention-pooling network, wherein the output noise-suppressed audio frame generated by the attention-pooling network is further based on the third noise-suppressed audio frame.

Example 36. The method of any of examples 22 to 35, wherein the first noise-suppression network corresponds to a speech generation network, wherein the second noise-suppression network corresponds to a generalized eigenvalue network, and wherein the third noise-suppression network corresponds to an adaptive beamforming network.

Example 37. The method of any of examples 22 to 36, wherein the speech generation network is configured to generate a voice activity detection signal that indicates a first set of frequency ranges associated with the audio data that are speech-dominant or indicates a second set of frequency ranges associated with the audio data that are noise-dominant.

Example 38. The method of any of examples 22 to 37, wherein at least one of the speech generation network or the eigenvalue network is configured to perform direction-of-arrival processing to determine a direction-of-arrival of incoming speech and a direction-of-arrival of incoming noise, and wherein parameters of the adaptive beamforming network are adjusted based on an output of the direction-of-arrival processing.

Example 39. A non-transitory computer-readable medium comprising instructions that, when executed by one or more processors, cause the one or more processors to: receive audio data including a first audio frame corresponding to a first output of a first microphone and a second audio frame corresponding to a second output of a second microphone; generate, at a first noise-suppression network, a first noise-suppressed audio frame based on the first audio frame and the second audio frame; generate, at a second noise-suppression network, a second noise-suppressed audio frame based on the first audio frame and the second audio frame; and perform, at an attention-pooling network, an attention-pooling operation on at least the first noise-suppressed audio frame and the second noise-suppressed audio frame to generate an output noise-suppressed audio frame.

Example 40. The non-transitory computer-readable medium of example 39, wherein the instructions further cause the one or more processors to perform, at an inference network associated with the one or more processors, a classification task on the output noise-suppressed audio frame to generate an inference result.

Example 41. The non-transitory computer-readable medium of any of examples 39 to 40, wherein the instructions further cause the one or more processors to train, based on the classification task, at least one of the first noise-suppression network, the second noise-suppression network, or the attention-pooling network.

Example 42. The non-transitory computer-readable medium of any of examples 39 to 41, wherein the instructions further cause the one or more processors to: determine a speech enhancement loss associated with the output noise-suppressed audio frame; determine a classification loss associated with the inference result; and determine a joint loss based on the speech enhancement loss and the classification loss, wherein the training is based on the joint loss.

Example 43. The non-transitory computer-readable medium of any of examples 39 to 42, wherein the instructions further cause the one or more processors to: generate, at a first power domain associated with the one or more processors, a wake-up signal in response to a determination that the inference result indicates a positive result, wherein the first power domain includes the first noise-suppression network, the second noise-suppression network, the attention-pooling network, and the inference network; and transition, based on the wake-up signal, a second power domain from a low-power mode to an active mode, wherein the second power domain verifies the inference result while in the active mode.

Example 44. The non-transitory computer-readable medium of any of examples 39 to 43, wherein the instructions further cause the one or more processors to perform a classification task on the output noise-suppressed audio frame to generate an inference result.

Example 45. The non-transitory computer-readable medium of any of examples 39 to 44, wherein the classification task corresponds to at least one of a keyword spotting task, an automatic speech recognition task, or an utterance verification task.

Example 46. The non-transitory computer-readable medium of any of examples 39 to 45, wherein the instructions further cause the one or more processors to determine the classification task associated with the inference network; and train, based on the classification task, at least one of the first noise-suppression network, the second noise-suppression network, or the attention-pooling network.

Example 47. The non-transitory computer-readable medium of any of examples 39 to 46, wherein the instructions further cause the one or more processors to operate a first power domain at a first power level, the first power domain comprising the first noise-suppression network, the second noise-suppression network, the attention-pooling network, and the inference network; and operate a second power domain at a second power level that is greater than the first power level, the second power domain selectively activated to verify the inference result.

Example 48. The non-transitory computer-readable medium of any of examples 39 to 47, wherein the second power domain is activated to verify the inference result in response to a determination that the inference result indicates a positive result.

Example 49. The non-transitory computer-readable medium of any of examples 39 to 48, wherein the second power domain comprises: a second-stage noise-suppression network configured to generate a second-stage noise-suppressed audio frame based on the first audio frame and the second audio frame; a second-stage attention-pooling network configured to generate a second-stage output noise-suppressed audio frame based at least on the output noise-suppressed audio frame, the first audio frame and the second audio frame, and the second-stage noise-suppressed audio frame; and a second inference network configured to perform the classification task on the second-stage output noise-suppressed audio frame to verify the inference result.

Example 50. The non-transitory computer-readable medium of any of examples 39 to 49, wherein the first power domain is integrated in an auxiliary device, and wherein the second power domain is integrated into a computing device that is paired with the auxiliary device.

Example 51. The non-transitory computer-readable medium of any of examples 39 to 50, wherein the auxiliary device comprises a headset.

Example 52. The non-transitory computer-readable medium of any of examples 39 to 51, wherein the instructions further cause the one or more processors to generate, at a third noise-suppression network, a third noise-suppressed audio frame based on the audio data; and provide the third noise-suppressed audio frame to the attention-pooling network, wherein the output noise-suppressed audio frame generated by the attention-pooling network is further based on the third noise-suppressed audio frame.

Example 53. The non-transitory computer-readable medium of any of examples 39 to 52, wherein the first noise-suppression network corresponds to a speech generation network, wherein the second noise-suppression network corresponds to a generalized eigenvalue network, and wherein the third noise-suppression network corresponds to an adaptive beamforming network.

Example 54. The non-transitory computer-readable medium of any of examples 39 to 53, wherein the speech generation network is configured to generate a voice activity detection signal that indicates a first set of frequency ranges associated with the audio data that are speech-dominant or indicates a second set of frequency ranges associated with the audio data that are noise-dominant.

Example 55. The non-transitory computer-readable medium of any of examples 39 to 54, wherein at least one of the speech generation network or the eigenvalue network is configured to perform direction-of-arrival processing to determine a direction-of-arrival of incoming speech and a direction-of-arrival of incoming noise, and wherein parameters of the adaptive beamforming network are adjusted based on an output of the direction-of-arrival processing.

Example 56. An apparatus comprising: means for receiving audio data including a first audio frame corresponding to a first output of a first microphone and a second audio frame corresponding to a second output of a second microphone; means for generating a first noise-suppressed audio frame based on the audio data; means for generating a second noise-suppressed audio frame based on the audio data; and means for performing an attention-pooling operation on at least the first noise-suppressed audio frame and the second noise-suppressed audio frame to generate an output noise-suppressed audio frame.

Example 57. The apparatus of example 56, further comprising means for performing a classification task on the output noise-suppressed audio frame to generate an inference result.

Example 58. The apparatus of any of examples 56 to 57, wherein the classification task corresponds to at least one of a keyword spotting task, an automatic speech recognition task, or an utterance verification task.

Example 59. A non-transitory computer-readable medium store instructions that, when executed by a processor, causes the processor to perform the method of any of examples 22 to 37.

Example 60. An apparatus includes means for carrying out the method of any of examples 22 to 37.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
a memory configured to store audio data; and
one or more processors configured to:
receive the audio data including a first audio frame corresponding to a first output of a first microphone and a second audio frame corresponding to a second output of a second microphone;
provide the audio data to a first noise-suppression network and to a second noise-suppression network, the first noise-suppression network configured to generate a first noise-suppressed audio frame based on the audio data, and the second noise-suppression network configured to generate a second noise-suppressed audio frame based on the audio data;
provide the first noise-suppressed audio frame and the second noise-suppressed audio frame to an attention-pooling network, the attention-pooling network configured to generate an output noise-suppressed audio frame based at least on the first noise-suppressed audio frame and the second noise-suppressed audio frame; and
provide the output noise-suppressed audio frame to an inference network associated with a classification task, the inference network configured to perform the classification task on the output noise-suppressed audio frame to generate an inference result.

2. The device of claim 1, further comprising the first microphone and the second microphone, wherein the first microphone and the second microphone are coupled to the one or more processors.

3. The device of claim 1, wherein the classification task corresponds to at least one of a keyword spotting task, an automatic speech recognition task, or an utterance verification task.

4. The device of claim 1, wherein the one or more processors are further configured to:
determine the classification task associated with the inference network; and
tune, based on the classification task, at least one of the first noise-suppression network, the second noise-suppression network, or the attention-pooling network.

5. The device of claim 1, wherein the one or more processors further comprise:
a first power domain configured to operate at a first power level, the first power domain comprising the first noise-suppression network, the second noise-suppression network, the attention-pooling network, and the inference network; and
a second power domain configured to operate at a second power level that is greater than the first power level, the second power domain selectively activated to verify the inference result.

6. The device of claim 5, wherein the second power domain is activated to verify the inference result in response to a determination that the inference result indicates a positive result.

7. The device of claim 5, wherein the second power domain comprises:
a second-stage noise-suppression network configured to generate a second-stage noise-suppressed audio frame based on the audio data;
a second-stage attention-pooling network configured to generate a second-stage output noise-suppressed audio frame based at least on the output noise-suppressed audio frame, the audio data, and the second-stage noise-suppressed audio frame; and
a second inference network configured to perform the classification task on the second-stage output noise-suppressed audio frame to verify the inference result.

8. The device of claim 5, wherein the first power domain is integrated in an auxiliary device, and wherein the second power domain is integrated into a computing device that is paired with the auxiliary device.

9. The device of claim 8, wherein the auxiliary device comprises a headset.

10. The device of claim 1, wherein the one or more processors are further configured to:
provide the audio data to a third noise-suppression network, wherein the third noise-suppression network is configured to generate a third noise-suppressed audio frame based on the audio data; and
provide the third noise-suppressed audio frame to the attention-pooling network, wherein the output noise-suppressed audio frame generated by the attention-pooling network is further based on the third noise-suppressed audio frame.

11. The device of claim 10, wherein the first noise-suppression network corresponds to a speech generation network, wherein the second noise-suppression network corresponds to a generalized eigenvalue network, and wherein the third noise-suppression network correspond to an adaptive beamforming network.

12. The device of claim 11, wherein the speech generation network is configured to generate a voice activity detection signal that indicates a first set of frequency ranges associated with the audio data that are speech-dominant or indicates a second set of frequency ranges associated with the audio data that are noise-dominant.

13. The device of claim 11, wherein at least one of the speech generation network or the eigenvalue network is configured to perform direction-of-arrival processing to determine a direction-of-arrival of incoming speech or a direction-of-arrival of incoming noise, and wherein parameters of the adaptive beamforming network are adjusted based on an output of the direction-of-arrival processing.

14. The device of claim 1, wherein the one or more processors are further configured to:
provide the audio data to the attention-pooling network, wherein the output noise-suppressed audio frame generated by the attention-pooling network is further based on the audio data provided to the attention-pooling network.

15. The device of claim 1, further comprising a modem coupled to the one or more processors, the modem configured to transmit the output noise-suppressed audio frame to a second device.

16. The device of claim 1, wherein the one or more processors are integrated in a headset device that includes the first microphone and the second microphone, and wherein the headset device is configured, when worn by a user, to position the first microphone closer than the second microphone to the user's mouth to capture utterances of the user at the first microphone with greater intensity and less delay as compared to at the second microphone.

17. The device of claim 1, wherein the one or more processors are integrated in at least one of a mobile phone, a tablet computer device, a wearable electronic device, a camera device, a virtual reality headset, a mixed reality headset, or an augmented reality headset.

18. The device of claim 1, wherein the one or more processors are integrated in a vehicle, the vehicle further including the first microphone and the second microphone, and wherein the first microphone is positioned to capture utterances of an operator of the vehicle.

19. A method of suppressing noise in an audio frame, the method comprising:
receiving, at one or more processors, audio data including a first audio frame corresponding to a first output of a first microphone and a second audio frame corresponding to a second output of a second microphone;
generating, at a first noise-suppression network associated with the one or more processors, a first noise-suppressed audio frame based on the first audio frame and the second audio frame;
generating, at a second noise-suppression network associated with the one or more processors, a second noise-suppressed audio frame based on the first audio frame and the second audio frame;
performing, at an attention-pooling network associated with the one or more processors, an attention-pooling operation on at least the first noise-suppressed audio frame and the second noise-suppressed audio frame to generate an output noise-suppressed audio frame; and
performing, at an inference network associated with the one or more processors, a classification task on the output noise-suppressed audio frame to generate an inference result.

20. The method of claim 19, further comprising tuning, based on the classification task, at least one of the first noise-suppression network, the second noise-suppression network, or the attention-pooling network.

21. The method of claim 20, further comprising:
determining a speech enhancement loss associated with the output noise-suppressed audio frame;
determining a classification loss associated with the inference result; and
determining a joint loss based on the speech enhancement loss and the classification loss, wherein the training is based on the joint loss.

22. The method of claim 19, further comprising:
generating, at a first power domain associated with the one or more processors, a wake-up signal in response to a determination that the inference result indicates a positive result, wherein the first power domain includes the first noise-suppression network, the second noise-suppression network, the attention-pooling network, and the inference network; and
transitioning, based on the wake-up signal, a second power domain from a low-power mode to an active mode, wherein the second power domain verifies the inference result while in the active mode.

23. A non-transitory computer-readable medium comprising instructions that, when executed by one or more processors, cause the one or more processors to:
receive audio data including a first audio frame corresponding to a first output of a first microphone and a second audio frame corresponding to a second output of a second microphone;
generate, at a first noise-suppression network, a first noise-suppressed audio frame based on the first audio frame and the second audio frame;
generate, at a second noise-suppression network, a second noise-suppressed audio frame based on the audio data;
perform, at an attention-pooling network, an attention-pooling operation on at least the first noise-suppressed audio frame and the second noise-suppressed audio frame to generate an output noise-suppressed audio frame; and
perform, at an inference network, a classification task on the output noise-suppressed audio frame to generate an inference result.

24. The non-transitory computer-readable medium of claim 23, wherein the instructions further cause the one or more processors to train, based on the classification task, at least one of the first noise-suppression network, the second noise-suppression network, or the attention-pooling network.

25. An apparatus comprising:
means for receiving audio data including a first audio frame corresponding to a first output of a first microphone and a second audio frame corresponding to a second output of a second microphone;
means for generating a first noise-suppressed audio frame based on the first audio frame and the second audio frame;
means for generating a second noise-suppressed audio frame based on the first audio frame and the second audio frame;
means for performing an attention-pooling operation on at least the first noise-suppressed audio frame and the second noise-suppressed audio frame to generate an output noise-suppressed audio frame; and
means for performing a classification task on the output noise-suppressed audio frame to generate an inference result.

26. The apparatus of claim 25, wherein the classification task corresponds to at least one of a keyword spotting task, an automatic speech recognition task, or an utterance verification task.

* * * * *